US011102448B2

(12) United States Patent
Toda et al.

(10) Patent No.: US 11,102,448 B2
(45) Date of Patent: Aug. 24, 2021

(54) IMAGE CAPTURING APPARATUS, IMAGE PROCESSING SYSTEM, IMAGE PROCESSING METHOD, AND RECORDING MEDIUM

(71) Applicants: Yoshiyuki Toda, Kanagawa (JP);
Tomohiro Ikeda, Kanagawa (JP);
Yoshinaga Kato, Kanagawa (JP);
Makoto Torikoshi, Kanagawa (JP)

(72) Inventors: Yoshiyuki Toda, Kanagawa (JP);
Tomohiro Ikeda, Kanagawa (JP);
Yoshinaga Kato, Kanagawa (JP);
Makoto Torikoshi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 21 days.

(21) Appl. No.: 16/804,241

(22) Filed: Feb. 28, 2020

(65) Prior Publication Data
US 2020/0288083 A1 Sep. 10, 2020

(30) Foreign Application Priority Data
Mar. 6, 2019 (JP) .............................. JP2019-040840

(51) Int. Cl.
*H04N 7/00* (2011.01)
*H04N 7/12* (2006.01)
(Continued)

(52) U.S. Cl.
CPC ......... *H04N 7/127* (2013.01); *H04N 5/23238* (2013.01); *H04N 7/0117* (2013.01);
(Continued)

(58) Field of Classification Search
CPC ............ H04N 7/00; H04N 5/00; H04N 13/00; H04N 21/00
See application file for complete search history.

(56) References Cited

U.S. PATENT DOCUMENTS

2019/0080197 A1   3/2019  Kato
2019/0295216 A1*  9/2019  Suitoh ..................... G06T 3/005
(Continued)

FOREIGN PATENT DOCUMENTS

JP         2007-325109        12/2007

OTHER PUBLICATIONS

U.S. Appl. No. 16/699,260, filed Nov. 29, 2019, Yoshinaga Kato.
(Continued)

*Primary Examiner* — Maryam A Nasri
(74) *Attorney, Agent, or Firm* — IPUSA, PLLC

(57) ABSTRACT

An image processing system includes circuitry to: obtain a wide-angle image captured by an image capturing apparatus; generate a first image representing a part of the wide-angle image; and determine whether a first area includes a second area, the first area being a viewable area to be displayed on a display, the second area being represented by the first image. Based on a determination that the first area does not include the second area, the circuitry further converts the first image into a second image, the second image having definition lower than that of the first image, and converts the wide-angle image into a third image, the third image having definition lower than that of the wide-angle image, such that the second image and the third image are displayable on the display of the information processing apparatus.

10 Claims, 17 Drawing Sheets

(51) Int. Cl.
*H04N 5/232* (2006.01)
*H04N 13/167* (2018.01)
*H04N 13/194* (2018.01)
*H04N 13/161* (2018.01)
*H04N 7/01* (2006.01)
*H04N 21/2187* (2011.01)
*H04N 21/2343* (2011.01)
*H04N 21/234* (2011.01)
*H04N 21/81* (2011.01)
*H04N 21/4728* (2011.01)

(52) U.S. Cl.
CPC ......... *H04N 13/161* (2018.05); *H04N 13/167* (2018.05); *H04N 13/194* (2018.05); *H04N 5/232* (2013.01); *H04N 21/2187* (2013.01); *H04N 21/23418* (2013.01); *H04N 21/234363* (2013.01); *H04N 21/4728* (2013.01); *H04N 21/816* (2013.01)

(56) References Cited

U.S. PATENT DOCUMENTS

| | | |
|---|---|---|
| 2019/0306175 A1 | 10/2019 | Kato et al. |
| 2019/0306334 A1 | 10/2019 | Katoh et al. |
| 2020/0043188 A1 | 2/2020 | Kato |
| 2020/0211153 A1* | 7/2020 | Kawaguchi ........... G06T 3/0018 |

OTHER PUBLICATIONS

U.S. Appl. No. 16/654,011, filed Oct. 16, 2019, Yoshiyuki Toda, et al.

U.S. Appl. No. 16/675,977, filed Nov. 6, 2019, Yoshinaga Kato, et al.

U.S. Appl. No. 16/728,156, filed Dec. 27, 2019, Keiichi Kawaguchi.

* cited by examiner

FIG. 13
(b)
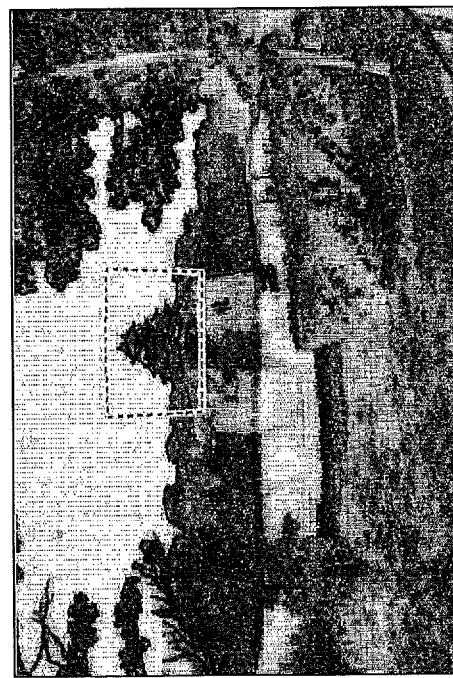
(a)

FIG. 14
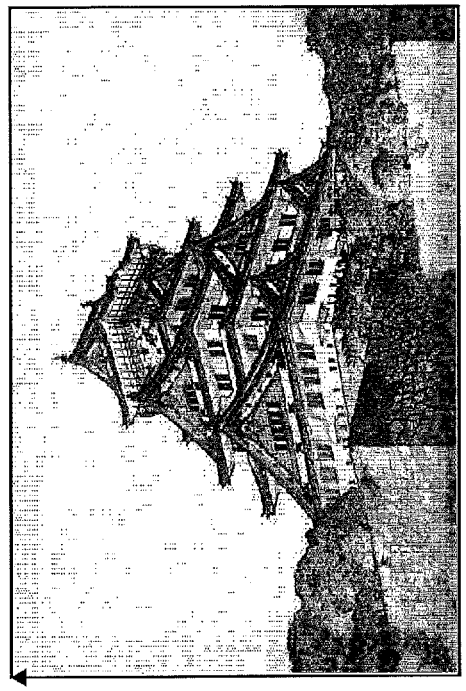
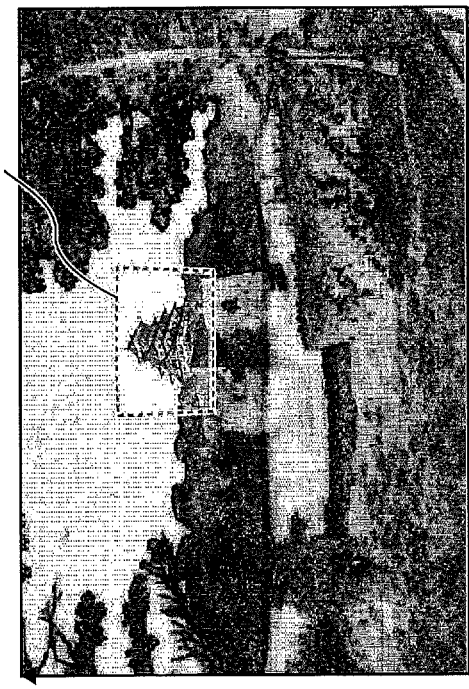

IMAGE CAPTURING APPARATUS, IMAGE PROCESSING SYSTEM, IMAGE PROCESSING METHOD, AND RECORDING MEDIUM

CROSS-REFERENCE TO RELATED APPLICATIONS

This patent application is based on and claims priority pursuant to 35 U.S.C. § 119(a) to Japanese Patent Application No. 2019-040840, filed on Mar. 6, 2019, in the Japan Patent Office, the entire disclosure of which is hereby incorporated by reference herein.

BACKGROUND

Technical Field

The present disclosure relates to an image capturing apparatus, an image processing system, an image processing method, and a recording medium.

Description of the Related Art

In the related art, there is known a method for distributing a plurality of pieces of video data from a server to a client via a network or any other medium.

For example, a client that receives and displays video data determines whether the video data is video data to be displayed on an active window. If the video data is not video data to be displayed on the active window, the bit rate for sending the video data is reduced to maintain the quality of effective stream video.

SUMMARY

Example embodiments include an image processing system including circuitry configured to: obtain a wide-angle image captured by an image capturing apparatus; generate a first image representing a part of the wide-angle image; and determine whether a first area includes a second area, the first area being a viewable area to be displayed on a display, the second area being represented by the first image. Based on a determination that the first area does not include the second area, the circuitry further converts the first image into a second image, the second image having definition lower than that of the first image, and converts the wide-angle image into a third image, the third image having definition lower than that of the wide-angle image, such that the second image and the third image are displayable on the display of the information processing apparatus.

For example, the image processing system includes an image capturing apparatus communicably connected to an information processing apparatus. The image capturing apparatus includes an imaging device to capture a wide-angle image; and circuitry configured to: generate a first image representing a part of the wide-angle image; and determine whether a first area includes a second area being represented by the first image, the first area being a viewable area to be displayed on a display of the information processing apparatus. Based on a determination that the first area does not include the second area, the circuitry further converts the first image into a second image, the second image having definition lower than that of the first image, converts the wide-angle image into a third image, the third image having definition lower than that of the wide-angle image, and transmit the second image and the third image to the information processing apparatus, such that the second image and the third image are displayable on the display of the information processing apparatus.

Example embodiments include an image processing method including: obtaining a wide-angle image, using an image capturing apparatus; generating a first image representing a part of the wide-angle image; and determining whether a first area includes a second area being represented by the first image, the first area being a viewable area to be displayed on a display of an information processing apparatus. Based on a determination that the first area does not include the second area, the method further includes: converting the first image into a second image, the second image having definition lower than that of the first image; converting the wide-angle image into a third image, the third image having definition lower than that of the wide-angle image; and transmitting the second image and the third image to the information processing apparatus, such that the second image and the third image are displayable on the display of the information processing apparatus.

Example embodiments include a control program for causing one or more processors to perform the above-described image processing method.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 13 is an illustration of a comparative example;

FIG. 14 is an illustration of an example using a partial image;

Figure 1:
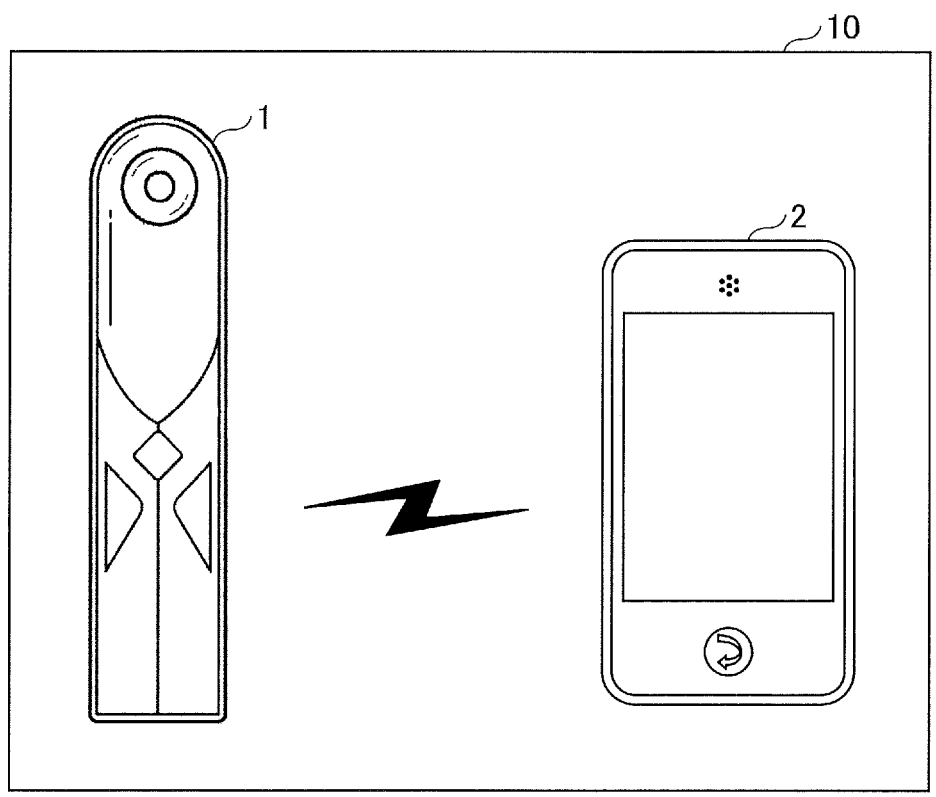
FIG. 1 illustrates an example general arrangement of an image processing system.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

In the related art, the bit rate is determined based on whether to display on an active window. However, such a related-art method does not assume display of an image captured with a wide viewing angle (hereinafter referred to as a "wide-angle image"). Specifically, when the image to be displayed is a wide-angle image, a user sometimes designates an area to be displayed. In the related-art method, the communication band may not, in many cases, be efficiently used for an image in which an area to be displayed is designated before the image is viewed by a user.

In view of this situation, an image processing system according to one or more embodiments described below may efficiently use the communication band even for a wide-angle image.

The following describes embodiments of the present disclosure with reference to the accompanying drawings.

First Embodiment

Example General Arrangement

FIG. 1 illustrates an example general arrangement of an image processing system 10. For example, the image processing system 10 includes a spherical image capturing apparatus 1 and a smart phone 2. The spherical image capturing apparatus 1 is an example of an image capturing apparatus, and the smart phone 2 is an example of an information processing apparatus. As illustrated in FIG. 1, the spherical image capturing apparatus 1 and the smart phone 2 are connected to each other via a network or any other suitable medium that is wired, wireless, or both, and are capable of transmitting and receiving data such as image data to and from each other.

The image data of an image captured and generated by the spherical image capturing apparatus 1 is sent to the smart phone 2. The image, which is displayed on the smart phone 2 based on the sent image data, is viewable to a user.

For example, as illustrated in FIG. 1, the spherical image capturing apparatus 1 is desirably a full-view spherical (or omnidirectional) image capturing apparatus that uses two imaging elements. Three or more imaging elements may be used. The image capturing apparatus may not necessarily be a dedicated apparatus to capture an omnidirectional image. That is, the image capturing apparatus may be implemented by retrofitting a digital camera, a smart phone, or any other suitable device with an omnidirectional image capturing unit or the like, such that the image capturing apparatus can capture a wide-angle image in a way similar to that for the spherical image capturing apparatus 1.

The smart phone 2 may be a personal computer (PC) or a tablet, for example.

Example Hardware Configuration of Image Capturing Apparatus

Figure 2:
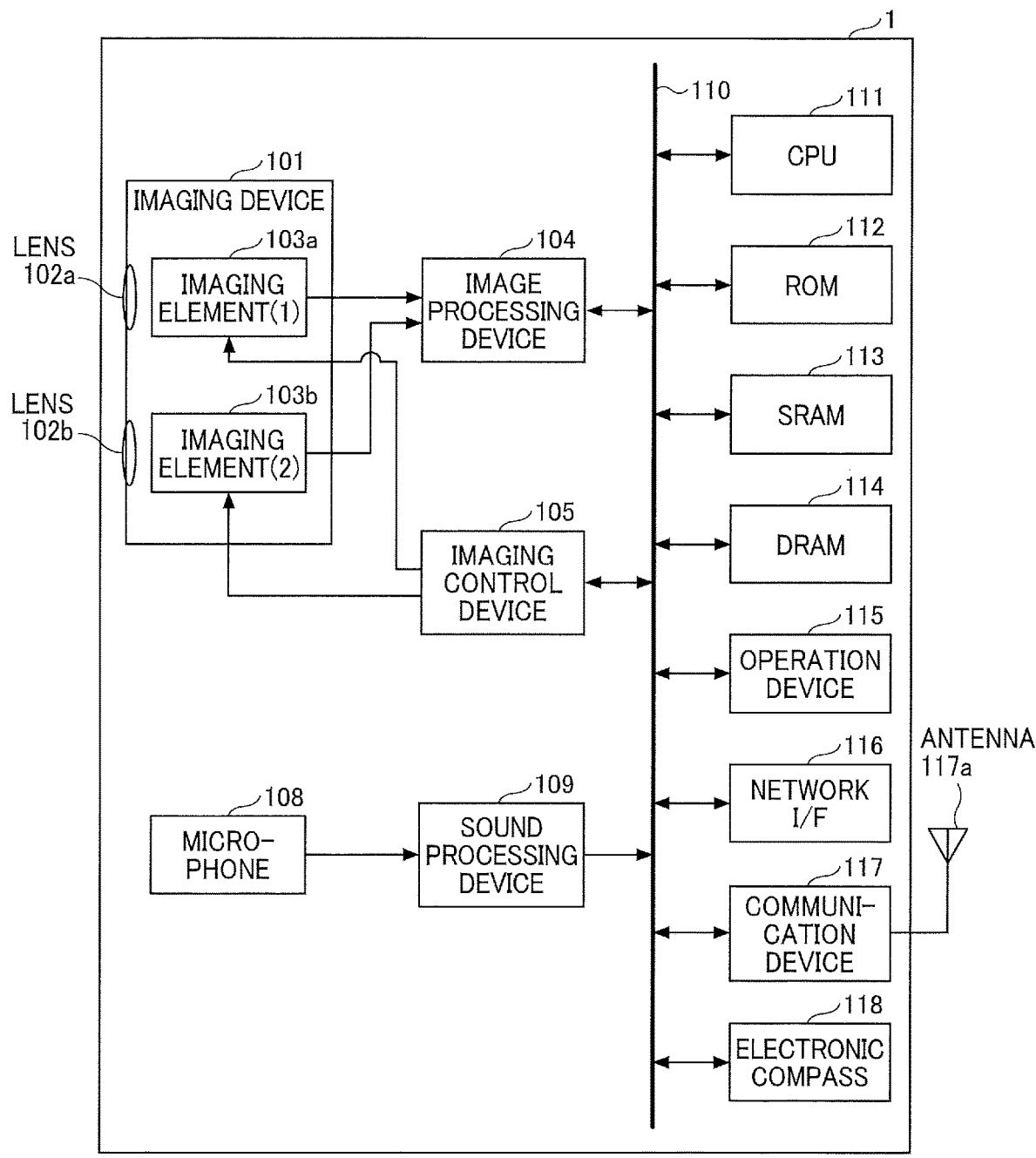
FIG. 2 is a block diagram illustrating an example hardware configuration of an image capturing apparatus.

FIG. 2 is a block diagram illustrating an example hardware configuration of the image capturing apparatus. For example, the spherical image capturing apparatus 1 has a hardware configuration including an imaging device 101, an image processing device 104, an imaging control device 105, a microphone 108, a sound processing device 109, a central processing unit (CPU) 111, a read-only memory (ROM) 112, a static random access memory (SRAM) 113, a dynamic random access memory (DRAM) 114, an operation device 115, a network interface (I/F) 116, a communication device 117, an antenna 117a, and an electronic compass 118.

The imaging device 101 includes, for example, optical components such as a lens 102a and a lens 102b. The imaging device 101 further includes an imaging element 103a and an imaging element 103b corresponding to the lens 102a and the lens 102b, respectively.

The lens 102a and the lens 102b are wide-angle lenses. Each of the lens 102a and the lens 102b is desirably a wide-angle lens or a fish-eye lens having a wide angle of view of 180° or more, for example, to allow the corresponding imaging element to form an image to capture a wide-angle image.

The imaging element 103a and the imaging element 103b convert optical images obtained by the lens 102a and the lens 102b to generate image data. Specifically, each of the imaging element 103a and the imaging element 103b is an optical sensor such as a complementary metal oxide semiconductor (CMOS) sensor or a charge coupled device (CCD) sensor. The imaging device 101 may further include a timing generation circuit or the like to generate pixel clocks and the like. The imaging device 101 may further include registers or the like to set commands, parameters, and so on to be used to operate the imaging elements and the like.

The imaging element 103a and the imaging element 103b are connected to the image processing device 104 via a parallel I/F bus or the like. Further, the imaging element 103a and the imaging element 103b are connected to the imaging control device 105 via a serial I/F bus (such as an I2C bus).

The image processing device 104, the imaging control device 105, and the sound processing device 109 are connected to the CPU 111 via a bus 110. The ROM 112, the SRAM 113, the DRAM 114, the operation device 115, the network I/F 116, the communication device 117, and the electronic compass 118 are also connected to the bus 110.

The image processing device 104 is, for example, an electronic circuit that performs image processing of image data. For example, the image processing device 104 obtains image data output from the imaging element 103a and image data output from the imaging element 103b via the parallel I/F bus. The image processing device 104 performs predetermined processing on the obtained pieces of image data. After the processing is performed, the image processing device 104 combines the pieces of image data to generate data of an equirectangular projection image.

For example, the imaging control device 105 serves as a master device, and the imaging element 103a and the imaging element 103b serve as slave devices. In this configuration, the imaging control device 105 sets commands and the like in the registers of the imaging element 103a and the imaging element 103b by using the I2C bus. The commands and the like are received from the CPU 111, for example. Further, the imaging control device 105 loads therein status data and the like set in the registers of the imaging element 103a and the imaging element 103b also by using the I2C bus, and sends the status data and the like to the CPU 111.

In response to an operation of, for example, pressing a shutter button of the operation device 115, the imaging control device 105 instructs the imaging element 103a and the imaging element 103b to release the shutter and output image data at the timing when the shutter button is pressed.

The spherical image capturing apparatus 1 has sometimes a function of displaying a preview or a moving image using a display (such as a display of the smart phone 2). In this case, the imaging element 103a and the imaging element 103b output image data successively at a preset frame rate or the like.

The imaging control device 105 may cooperate with the CPU 111 or the like to function as a synchronization controller or the like that controls the imaging element 103a and the imaging element 103b to synchronize the respective timings at which the imaging element 103a and the imaging element 103b output image data.

The microphone 108 is an example of an input device that converts a sound into data.

The sound processing device 109 is, for example, an electronic circuit. For example, the sound processing device 109 obtains sound data output from the microphone 108 via an I/F bus. Then, the sound processing device 109 performs predetermined processing on the sound data.

The CPU 111 is an example of a computation apparatus and a control apparatus. For example, the CPU 111 controls the overall operation of the spherical image capturing apparatus 1. One or more CPUs 111 may be used.

The ROM 112 is an example of a storage device that stores programs and so on.

The SRAM 113 and the DRAM 114 are examples of a main storage device. For example, the SRAM 113 and the DRAM 114 serve as a work memory and store programs, data, and so on used by the CPU 111. In particular, the DRAM 114 stores image data being processed by the image processing device 104 and processed data of an equirectangular projection image.

The operation device 115 is an input device such as a switch. For example, the operation device 115 accepts the user's operation to set a mode or imaging conditions.

The network I/F 116 is an interface that transmits and receives data to and from an external device. The network I/F 116 is, for example, a connector and an electronic circuit that performs processing. Specifically, the network I/F 116 is a Universal Serial Bus (USB) interface or a drive or the like that accepts a medium. The network I/F 116 may wirelessly transmit and receive data using an antenna or the like.

The communication device 117 is an electronic circuit or the like that communicates with an external device. For example, the communication device 117 wirelessly transmits and receives data to and from an external device via the antenna 117a. Specifically, the communication device 117 performs communication via Wi-Fi (registered trademark) or Bluetooth (registered trademark), for example.

The electronic compass 118 is a sensor that calculates the orientation of the spherical image capturing apparatus 1 from the Earth's magnetism, for example. Examples of orientation information output from the electronic compass 118 include related information (metadata) complying with the Exif (registered trademark) standard. The related information is used to correct an image, for example. The related information may include data indicating the date and time at which the image is captured, the data size, and so on.

The hardware configuration of the image capturing apparatus is not limited to the illustrated one. For example, the image capturing apparatus may have a hardware configuration that further includes a display.

The image capturing apparatus may further include sensors such as a gyro sensor and an acceleration sensor. The image capturing apparatus may have a terminal or the like to be used for connection with an external device.

The image capturing apparatus and the information processing apparatus may further include hardware resources other the illustrated ones externally or internally.

Example Hardware Configuration of Information Processing Apparatus

Figure 3:
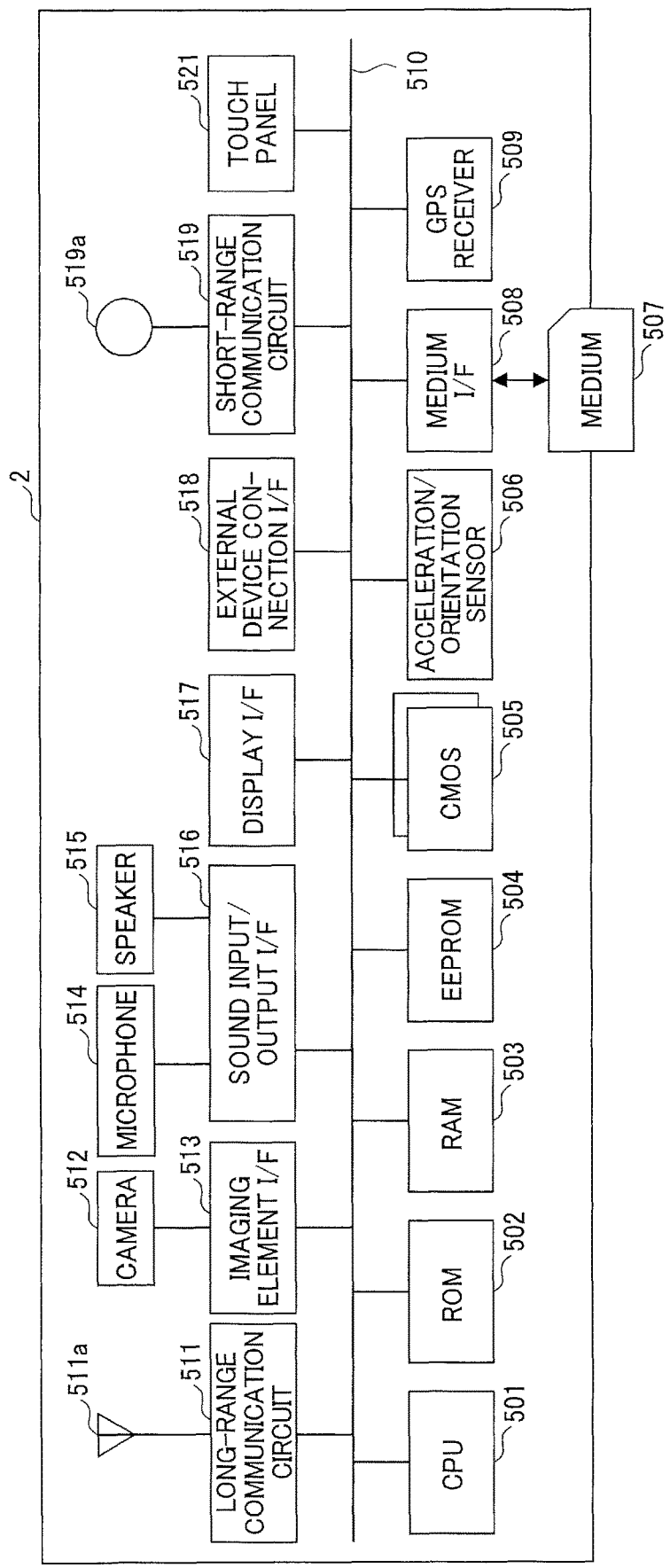
FIG. 3 is a block diagram illustrating an example hardware configuration of an information processing apparatus.

FIG. 3 is a block diagram illustrating an example hardware configuration of the information processing apparatus. For example, the smart phone 2 has a hardware configuration including a CPU 501, a ROM 502, a RAM 503, an electrically erasable programmable ROM (EEPROM) 504, a CMOS sensor 505, an acceleration/orientation sensor 506, a medium I/F 508, and a Global Positioning System (GPS) receiver 509.

The CPU 501 is an example of a computation apparatus and a control apparatus.

For example, the CPU 501 controls the overall operation of the smart phone 2. One or more CPUs 501 may be used.

The ROM 502 is an example of a storage device that stores programs and so on.

The RAM 503 is an example of a main storage device serving as a work memory.

The EEPROM 504 is an example of a storage device that stores programs, data, and so on.

The CMOS sensor 505 is an example of an optical sensor.

The acceleration/orientation sensor 506 is an example of a sensor that calculates the orientation from magnetism or the like and a sensor that detects the acceleration.

The medium I/F 508 is an interface that writes and reads data to and from a medium 507.

The GPS receiver 509 is an example of an input device that receives a GPS signal or the like from a satellite.

For example, the smart phone 2 has a hardware configuration further including a long-range communication circuit 511, a camera 512, an imaging element I/F 513, a microphone 514, a speaker 515, a sound input/output I/F 516, a display I/F 517, an external device connection I/F 518, a short-range communication circuit 519, an antenna 519a, and a touch panel 521.

The long-range communication circuit 511 is an electronic circuit or the like that communicates with an external device via a network such as the Internet.

The imaging element I/F 513 is an electronic circuit or the like that controls the camera 512 or the like.

The sound input/output I/F 516 is an electronic circuit or the like that inputs and outputs a sound using the microphone 514 and the speaker 515.

The display I/F 517 is an interface to be connected to an output device such as a display.

The external device connection I/F 518 is an interface to be connected to an external device.

The short-range communication circuit 519 is an electronic circuit or the like that communicates with an external device via the antenna 519a.

The touch panel 521 is an example of an output device that displays an image to a user. Further, the touch panel 521 is an example of an input device that accepts an operation performed by the user.

The hardware resources described above are connected via a bus line 510 or the like to transmit and receive data to and from each other.

Example Functional Configuration of Image Capturing Apparatus

Figure 4:
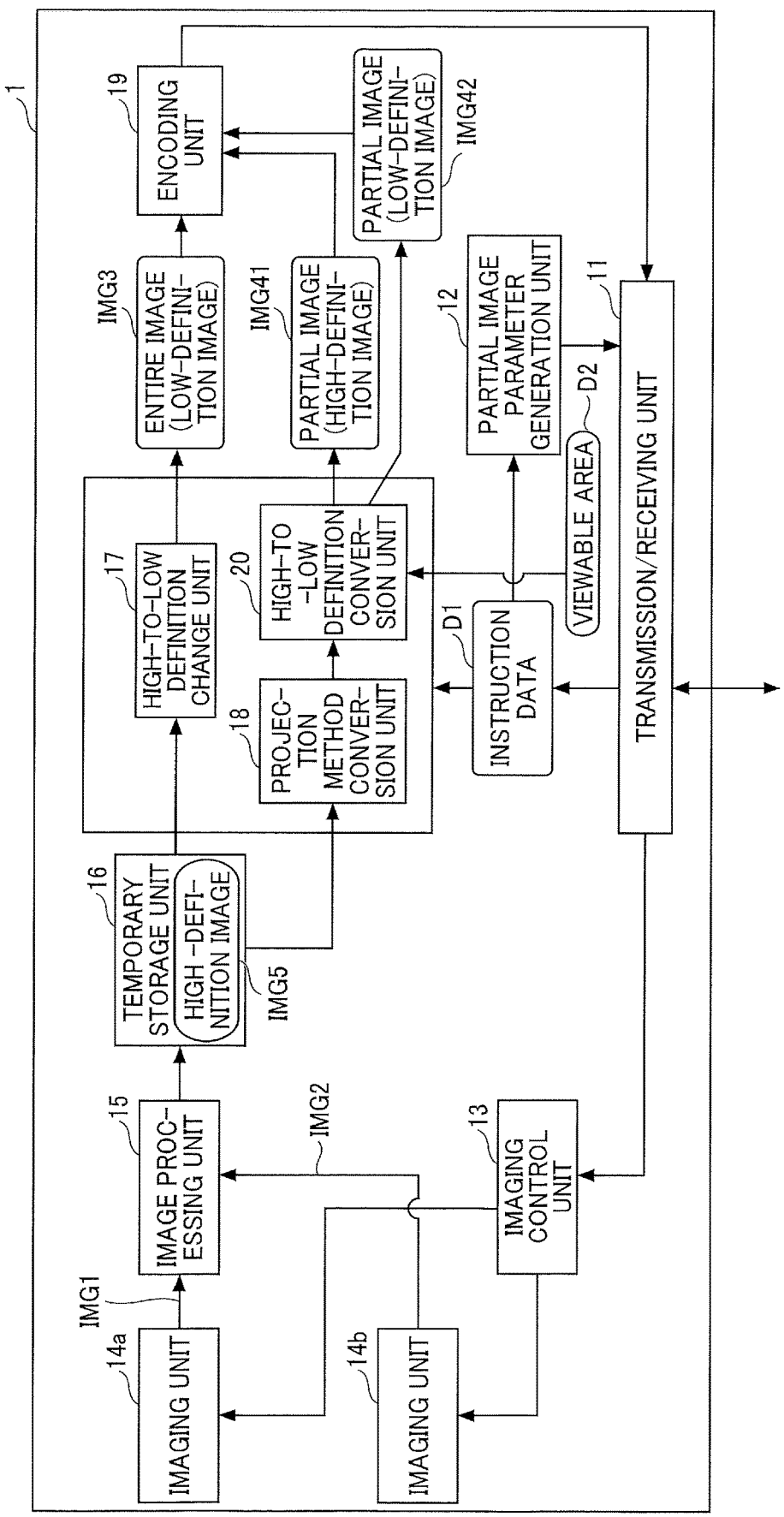
FIG. 4 is a block diagram illustrating an example functional configuration of the image capturing apparatus.

FIG. 4 is a block diagram illustrating an example functional configuration of the image capturing apparatus. For example, the spherical image capturing apparatus 1 has a functional configuration including a transmission/receiving unit 11, a partial image parameter generation unit 12, an imaging control unit 13, an imaging unit 14a, an imaging unit 14b, an image processing unit 15, a temporary storage unit 16, a high-to-low definition change unit 17, a projection method conversion unit 18, an encoding unit 19, and a high-to-low definition conversion unit 20. These functional units are implemented by the SRAM 113, the DRAM 114, and the CPU 111, for example.

The transmission/receiving unit 11 transmits data to an external device such as an information processing apparatus or receives data from the external device. Specifically, the transmission/receiving unit 11 transmits image data and partial image parameters to the smart phone 2.

The partial image parameter generation unit 12 generates partial image parameters in accordance with instruction data sent from the smart phone 2. The instruction data is data input by a user to specify a superimposition area.

The imaging control unit 13 controls the imaging unit 14a and the imaging unit 14b to synchronize the timings at which the imaging unit 14a and the imaging unit 14b outputs images.

The imaging unit 14a and the imaging unit 14b capture images of an object and the like in accordance with an instruction given from the imaging control unit 13, and output hemispherical images, which are used to generate a wide-angle image. The hemispherical images are hereinafter referred to as a "hemispherical image IMG1" and "hemispherical image IMG2".

The image processing unit 15 performs conversion or the like to, for example, combine two hemispherical images into an equirectangular projection image that is an image in equirectangular projection.

The temporary storage unit 16 stores data of the equirectangular projection image. The equirectangular projection image is a relatively high definition image.

The high-to-low definition change unit 17 changes a high-definition image to a low-definition image by, for example, reducing the size of the image in accordance with the instruction data to generate image data. The low-definition equirectangular projection image generated by the high-to-low definition change unit 17 is hereinafter referred to as an "entire image IMG3".

The high-definition image is, for example, a 2K, 4K, or 8K image in equirectangular projection. In contrast, the entire image IMG3, which is generated by the high-to-low definition change unit 17, is an image having a lower definition (lower resolution) than the high-definition image, such as a 1K, 2K, or 4K image.

The projection method conversion unit 18 generates an image (hereinafter referred to as a "partial image") representing a portion of the entire image IMG3 in accordance with instruction data D1. The instruction data D1 indicates, for example, the direction, the angle of view, and the like for specifying an area corresponding to the partial image. The instruction data D1 further indicates the aspect ratio of the partial image, the size of the image data, and the like. In accordance with the instruction data D1 including the parameters described above, the projection method conversion unit 18 converts the projection method from equirectangular projection to perspective projection.

The encoding unit 19 encodes data of the entire image and the partial image.

The high-to-low definition conversion unit 20 determines whether an area indicated by a viewable area D2 includes an area represented by the partial image. If it is determined that the area identified by the viewable area D2 includes the area represented by the partial image, the high-to-low definition conversion unit 20 generates a partial image (high-definition image) IMG41 by, for example, maintaining the resolution of the image stored in the temporary storage unit 16. On the other hand, if it is determined that the area identified by the viewable area D2 does not include the area represented by the partial image, the high-to-low definition conversion unit 20 generates a partial image (low-definition image) IMG42. To generate a plurality of partial images, the high-to-low definition conversion unit 20 determines, for each of the partial images, whether to generate the partial image (high-definition image) IMG41 or the partial image (low-definition image) IMG42.

The viewable area D2 is, for example, an area designated by the user using the smart phone 2 or the like. For example, the viewable area D2 is data indicating the angle of view for display or the like. The viewable area D2 may be designated using coordinates or the like.

Example Functional Configuration of Information Processing Apparatus

Figure 5:
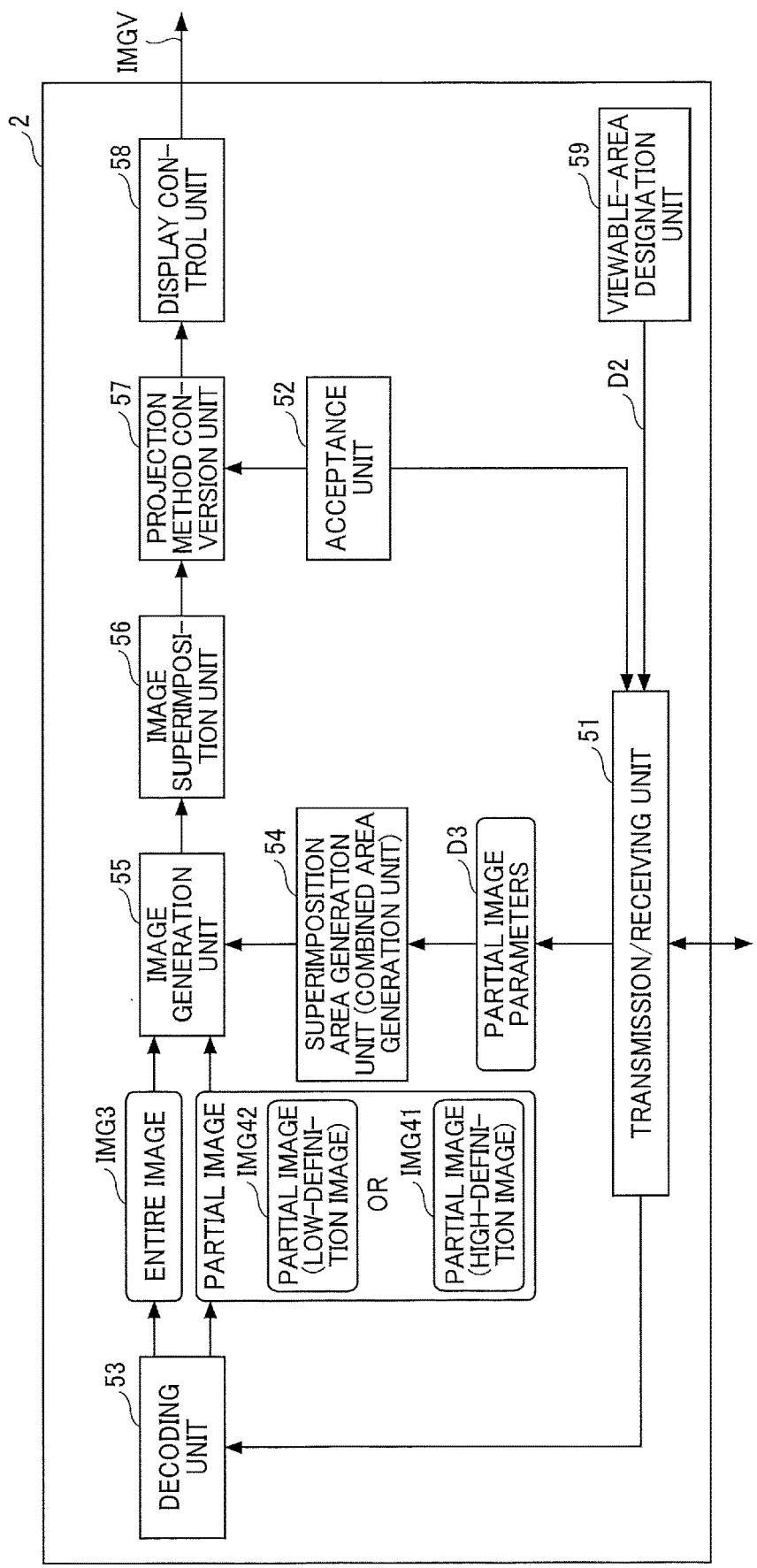
FIG. 5 is a block diagram illustrating an example functional configuration of the information processing apparatus.

FIG. 5 is a block diagram illustrating an example functional configuration of the information processing apparatus. For example, the smart phone 2 has a functional configuration including a transmission/receiving unit 51, an acceptance unit 52, a decoding unit 53, a superimposition area generation unit 54, an image generation unit 55, an image superimposition unit 56, a projection method conversion unit 57, a display control unit 58, and a viewable-area designation unit 59. These functional units are implemented by the EEPROM 504, the RAM 503, and the CPU 501, for example.

The transmission/receiving unit 51 transmits and receives data to and from an external device. For example, the transmission/receiving unit 51 receives image data from the spherical image capturing apparatus 1. Further, the transmission/receiving unit 51 transmits the instruction data D1 and the viewable area D2 to the spherical image capturing apparatus 1. When the data transmitted from the spherical image capturing apparatus 1 includes a plurality of pieces of data, the transmission/receiving unit 51 may separate the pieces of data into data types. For example, when the data transmitted from the spherical image capturing apparatus 1 collectively includes an entire image, a partial image, and partial image parameters D3, the transmission/receiving unit 51 separates the entire image, the partial image, and the partial image parameters D3 from one another as different pieces of data.

The acceptance unit 52 accepts an operation of specifying conditions such as the direction in which the user displays the partial image, the angle of view, the aspect ratio, and the size of the image data.

The decoding unit 53 decodes encoded data transmitted from the spherical image capturing apparatus 1.

The superimposition area generation unit 54 generates a superimposition area that is determined based on the partial image parameters D3 and the like.

The superimposition area indicates the position and area where a superimposed image S and a mask image M are to be superimposed. The details will be described below.

The image generation unit 55 generates, based on the superimposition area, the superimposed image S and the mask image M. Further, the image generation unit 55 generates, based on the entire image, a full-view spherical image CE, for example.

The image superimposition unit 56 superimposes the superimposed image S and the mask image M on a superimposition area in the full-view spherical image CE to generate the full-view spherical image CE to be finally displayed.

The projection method conversion unit 57 converts the projection method of the full-view spherical image CE in accordance with the conditions accepted by the acceptance unit 52 to obtain an image in perspective projection.

The display control unit 58 performs control to display the obtained image in perspective projection (hereinafter referred to as a "display image IMGV").

The viewable-area designation unit 59 detects the viewable area D2. The viewable area D2 is detected in form of angle of view, for example. For example, when the viewable area D2 changes, the viewable-area designation unit 59 detects the viewable area D2 and notifies the transmission/receiving unit 51 of the viewable area D2. Each time the transmission/receiving unit 51 is notified of the viewable area D2, the transmission/receiving unit 51 transmits the viewable area D2 to the spherical image capturing apparatus 1.

Example Overall Process

In an overall process, first, the spherical image capturing apparatus 1 performs the following processing.

Figure 6:
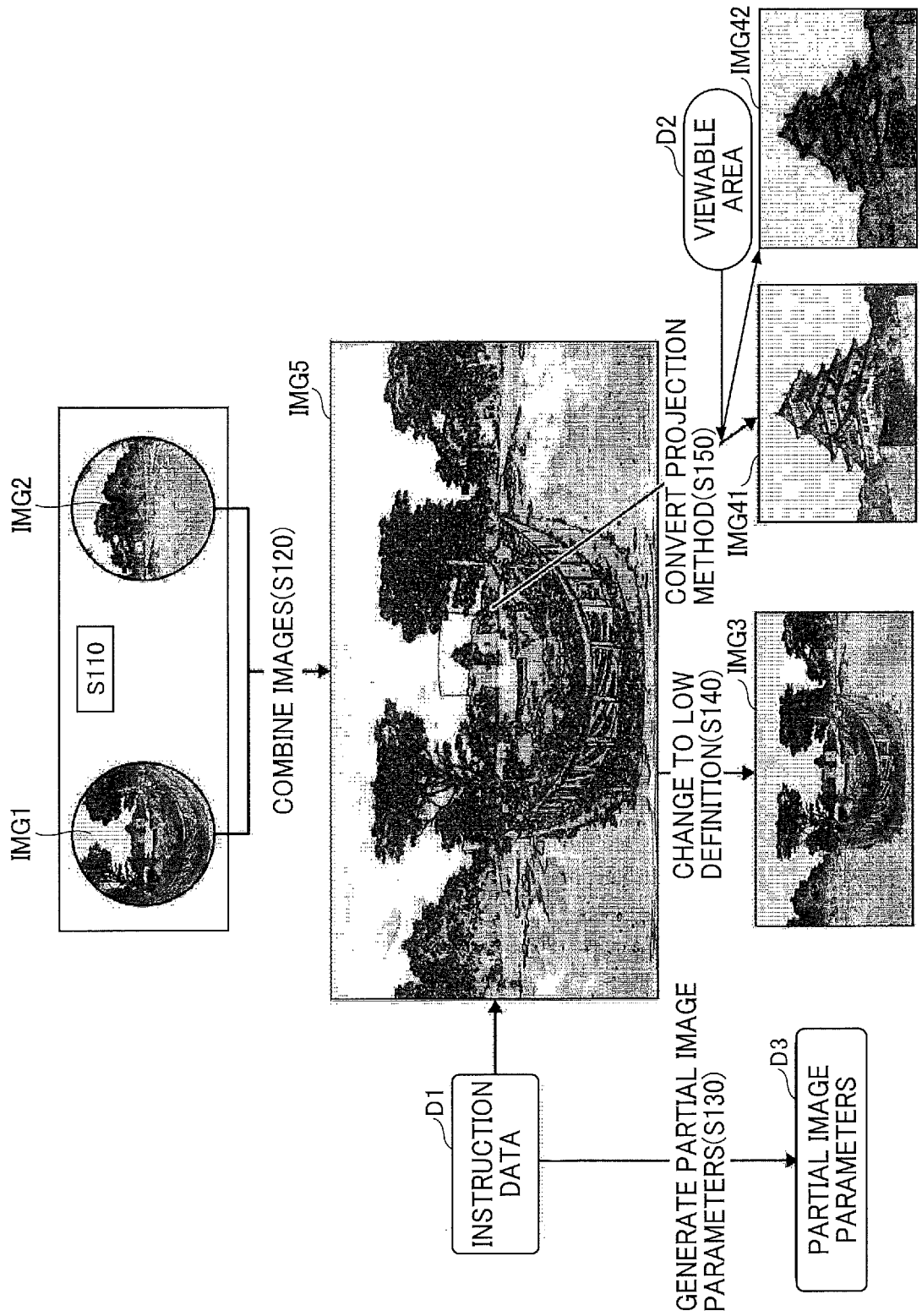
FIG. 6 is a flow diagram illustrating an example process performed by the image capturing apparatus.

FIG. 6 is a flow diagram illustrating an example process performed by the image capturing apparatus. When the overall process starts, for example, the spherical image capturing apparatus 1 starts the processing of step S110.

In step S110, the spherical image capturing apparatus 1 performs an image capturing operation to generate the hemispherical image IMG1 and the hemispherical image IMG2.

In step S120, the spherical image capturing apparatus 1 combines the hemispherical image IMG1 and the hemispherical image IMG2. For example, the spherical image capturing apparatus 1 converts two pieces of hemispherical image data into data of an equirectangular projection image, which is an image in equirectangular projection, by combining the pieces of hemispherical image data. A high-definition image generated as a result of the combination described above, which shows a wide area, is a wide-angle image IMG5. In the example illustrated in FIG. 4, the wide-angle image IMG5 is stored in the temporary storage unit 16.

In step S130, the spherical image capturing apparatus 1 generates the partial image parameters D3 in accordance with the instruction data D1. The details of the partial image parameters D3 will be described below.

In step S140, the spherical image capturing apparatus 1 changes the high-definition image to a low-definition image in accordance with the instruction data D1 to generate the entire image IMG3 (low-definition image).

In step S150, the spherical image capturing apparatus 1 generates the partial image (high-definition image) IMG41 or the partial image (low-definition image) IMG42 in accordance with the viewable area D2. Specifically, when the viewable area D2 includes the area represented by the partial image, the spherical image capturing apparatus 1 generates the partial image (high-definition image) IMG41. On the other hand, when the viewable area D2 does not include the area represented by the partial image, the spherical image capturing apparatus 1 generates the partial image (low-definition image) IMG42. That is, the resolution of the partial image is changed in accordance with whether the partial image is displayed within the viewable area D2.

Example of Partial Image Parameters and Example of Generation of Partial Image

Figure 7:
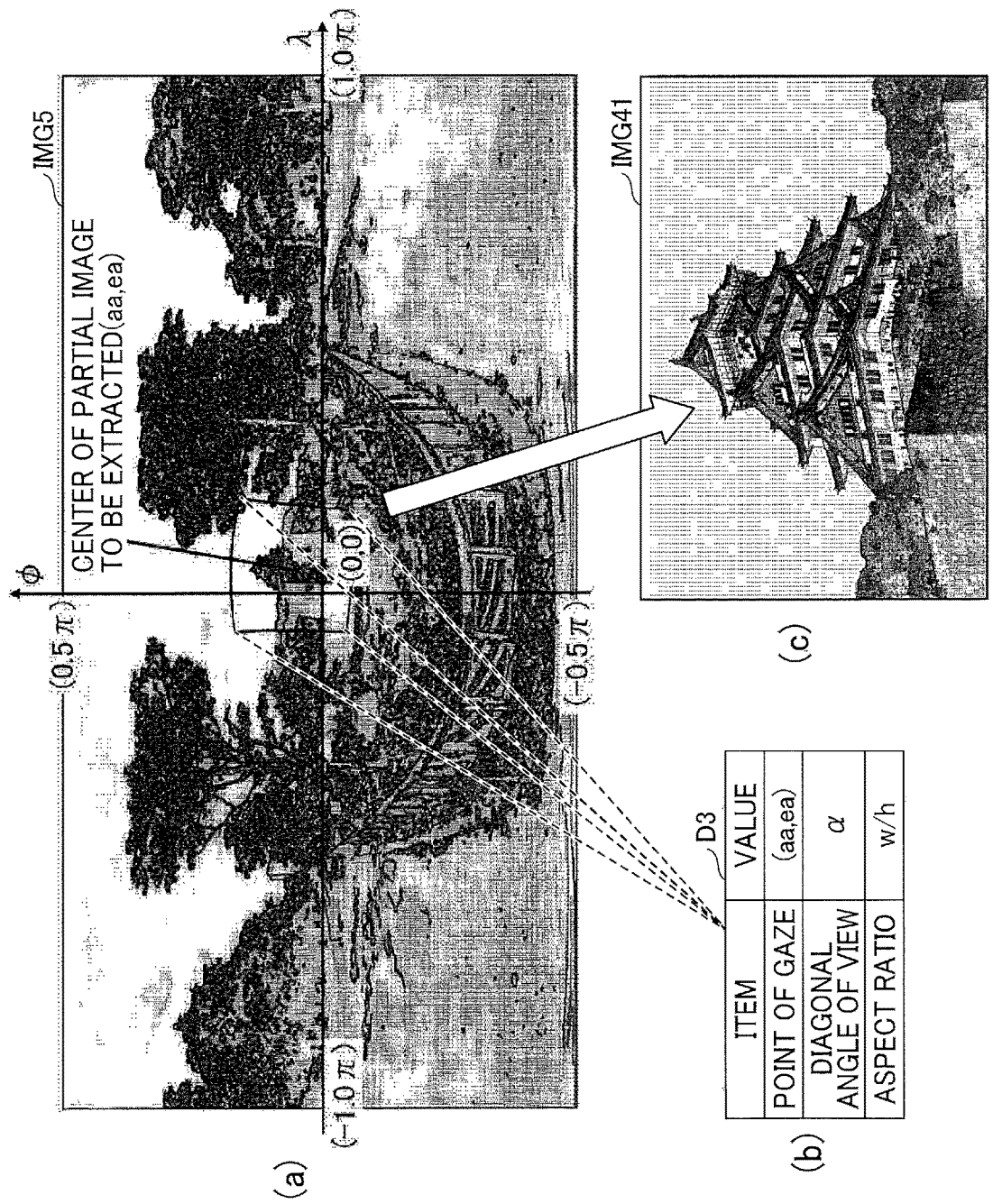
FIG. 7 is an illustration of an example of partial image parameters.

FIG. 7 is an illustration of an example of partial image parameters. A description will be made using the wide-angle image IMG5 illustrated in FIG. 7(a), by way of example. In FIG. 7(a), the horizontal axis represents "latitude $\lambda$" corresponding to the azimuth angle, and the vertical axis represents "longitude $\phi$" corresponding to the elevation angle.

FIG. 7(b) illustrates an example of the partial image parameters D3. As illustrated in FIG. 7(b), the partial image parameters D3 are parameters for specifying an area corresponding to a partial image illustrated in FIG. 7(c). As illustrated in FIG. 7(b), the partial image parameters D3 may be parameters that allow an area corresponding to a partial image to be specified. Thus, the partial image parameters D3 are not limited to those illustrated in FIG. 7(b). For example, the value of the aspect ratio may be fixed.

As illustrated in FIG. 7(c), when the partial image parameters D3 are present, the partial image (high-definition image) IMG41 is generated by extracting the partial image (high-definition image) IMG41 from the wide-angle image IMG5.

In the illustrated example, the spherical image capturing apparatus 1 maps an equirectangular projection image on a sphere in such a manner that the equirectangular projection image covers the sphere to generate a full-view spherical image. Thus, the data of the pixels of the equirectangular projection image can be made to correspond to the data of the pixels of a three-dimensional full-view spherical image on a surface of the sphere. The projection method conversion unit 18 applies a conversion formula to determine rectangular coordinates (x, y, z), which are three-dimensional coordinates of a point on the sphere, using, for example, Eq. (1) below, where the coordinates of the corresponding point on the equirectangular projection image are represented by (latitude, longitude)=(e, a).

$$(x,y,z) = (\cos(e) \times \cos(a), \cos(e) \times \sin(a), \sin(e)) \quad (1)$$

In Eq. (1), the sphere has a radius of "1".

The partial image, which is a perspective projection image, is a two-dimensional image. When the partial image is represented in two-dimensional polar coordinates (moving radius, argument)=(r, a), the moving radius "r" corresponds to the diagonal angle of view. The moving radius "r" has a value in the range of "0≤r≤tan(diagonal angle of view/2)". When the partial image is represented using the two-dimensional rectangular coordinates (u, v), the conversion relationship between the rectangular coordinates (u, v) and the polar coordinates (moving radius, argument)=(r, a) is given by Eq. (2) below.

$$u = r \times \cos(a), v = r \times \sin(a) \quad (2)$$

Then, the coordinates given by Eq. (1) are made to correspond to the three-dimensional coordinates (moving radius, polar angle, azimuth).

For the surface of the sphere CS, the moving radius in the three-dimensional polar coordinates is "1". The equirectangular projection image mapped on the surface of the sphere CS is converted into an image in perspective projection, which is expressed in two-dimensional polar coordinates (moving radius, argument)=(r, a), described above, using Eqs. (3) and (4) below, assuming that a virtual camera is located at the center of the sphere CS.

$$r = \tan(\text{polar angle}) \quad (3)$$

$$a = \text{azimuth} \quad (4)$$

In Eq. (3), if the polar angle is denoted by "t", t=arctan(r) is satisfied. Accordingly, the three-dimensional polar coordinates (moving radius, polar angle, azimuth) are expressed as (moving radius, polar angle, azimuth)=(1, arctan(r), a).

The conversion formula for conversion from the three-dimensional polar coordinates to the rectangular coordinates (x, y, z) is Eq. (5), for example.

$$(x,y,z) = (\sin(t) \times \cos(a), \sin(t) \times \sin(a), \cos(t)) \quad (5)$$

Eq. (5) can be applied for conversion between an entire image in equirectangular projection and a partial image in perspective projection. Specifically, the moving radius "r", which corresponds to the diagonal angle of view of the partial image, can be used to calculate transformation map coordinates, which indicate a correspondence between the location of each of the pixels of the partial image and the coordinates on the equirectangular projection image. With the use of the transformation map coordinates, a partial image, which is a perspective projection image, can be generated from the equirectangular projection image.

The projection method is converted in the way described above such that the position on the equirectangular projection image indicated by (latitude, longitude)=(90°, 0°) corresponds to the central point of the partial image that is a perspective projection image.

When perspective projection is applied to an arbitrary point in the equirectangular projection image as a point of gaze, a sphere on which the equirectangular projection image is mapped is rotated. In this way, coordinate rotation may be performed such that the point of gaze is located at a position identified by the coordinates (90°, 0°) as (latitude, longitude). The conversion formula used for the rotation of the sphere is a known coordinate rotation formula and will not be described.

The partial image (high-definition image) IMG41 and the entire image IMG3 generated in the way described above are transmitted to the information processing apparatus in the following form, for example.

Figure 8:
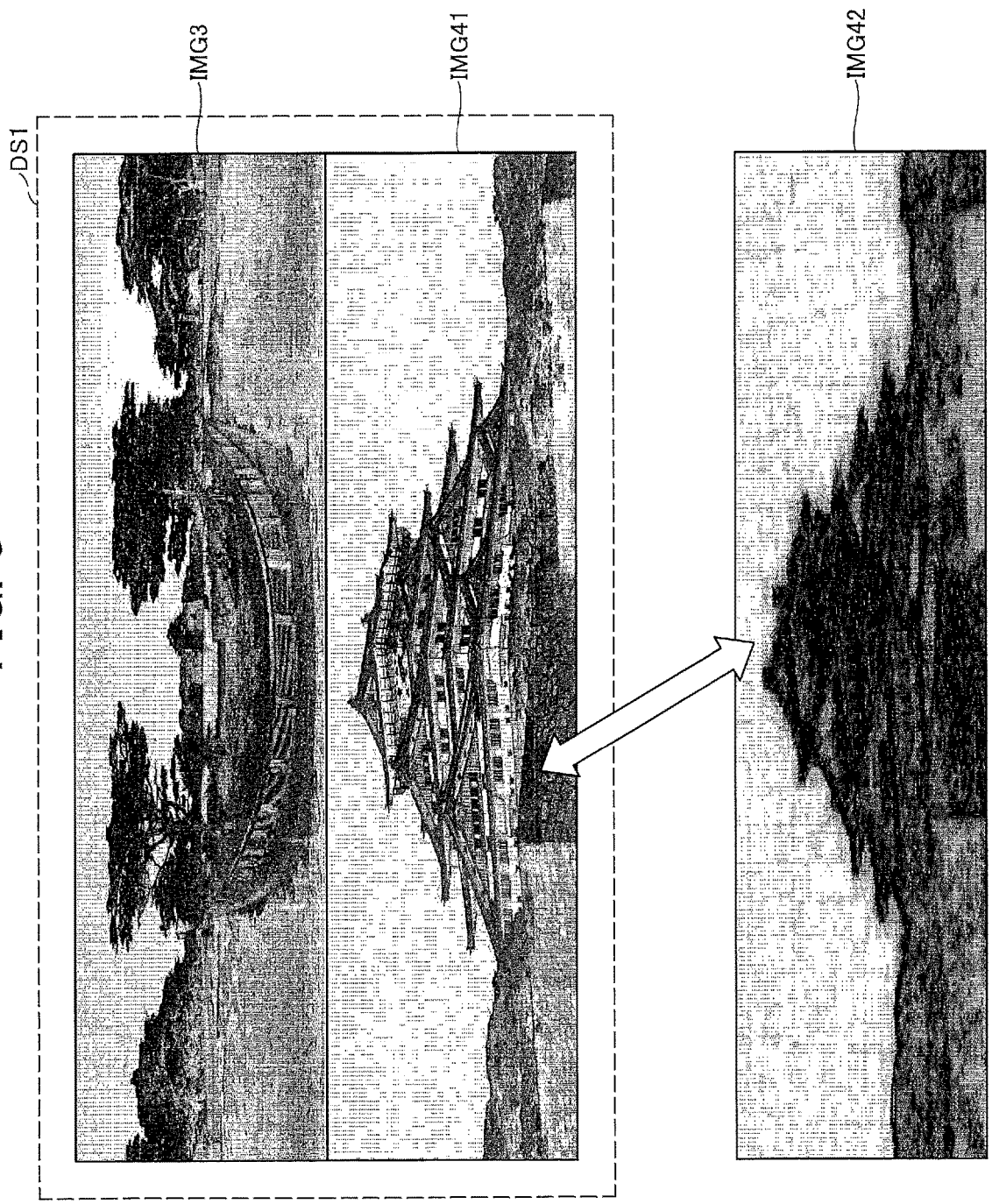
FIG. 8 is an illustration of an example of transmission data.

FIG. 8 illustrates an example of transmission data. For example, the spherical image capturing apparatus 1 transmits data (hereinafter referred to as "transmission data DS1") collectively including the partial image (high-definition image) IMG41 and the entire image IMG3 to the information processing apparatus.

Specifically, the transmission data DS1 is data indicating a single image having an upper portion in which the entire image IMG3 is arranged, and a lower portion in which the partial image (high-definition image) IMG41 is arranged. In the illustrated example, the images are arranged so as to fit an aspect ratio of 16:9, which is used for high definition (HD) video. However, the aspect ratio is not limited to that for HID and may be set to any other value. Furthermore, the images may not necessarily be arranged vertically in the manner illustrated in FIG. 8, and may be arranged horizontally or the like. When a plurality of partial images are present, for example, an entire image may be arranged in the upper half and the lower half may be divided into a number of sections corresponding to the number of partial images such that each of the partial images is arranged in one of the sections. Accordingly, the partial image (high-definition image) IMG41 and the entire image IMG3 are combined into a single image, which facilitates synchronization between the images. The spherical image capturing apparatus 1 may transmit the entire image and the partial image separately to the information processing apparatus.

Since the partial image (low-definition image) IMG42 is generated when the viewable area D2 does not include the area represented by the partial image, as illustrated in FIG. 8, the transmission data DS1 includes a combination of the entire image IMG3 and the partial image (low-definition image) IMG42. In this case, the transmission data DS1 has a smaller data size than that including a combination of the entire image IMG3 and the partial image (high-definition image) IMG41 because of the partial image (low-definition image) IMG42 having a smaller data size than the partial image (high-definition image) IMG41. Accordingly, in the image processing system, the transmission data DS1 can be transmitted between the spherical image capturing apparatus 1 and the information processing apparatus at a low bit rate. The image processing system can therefore efficiently use the communication band.

When the transmission data DS1 is transmitted to the information processing apparatus in the overall process, the information processing apparatus performs the following processing.

Figure 9:
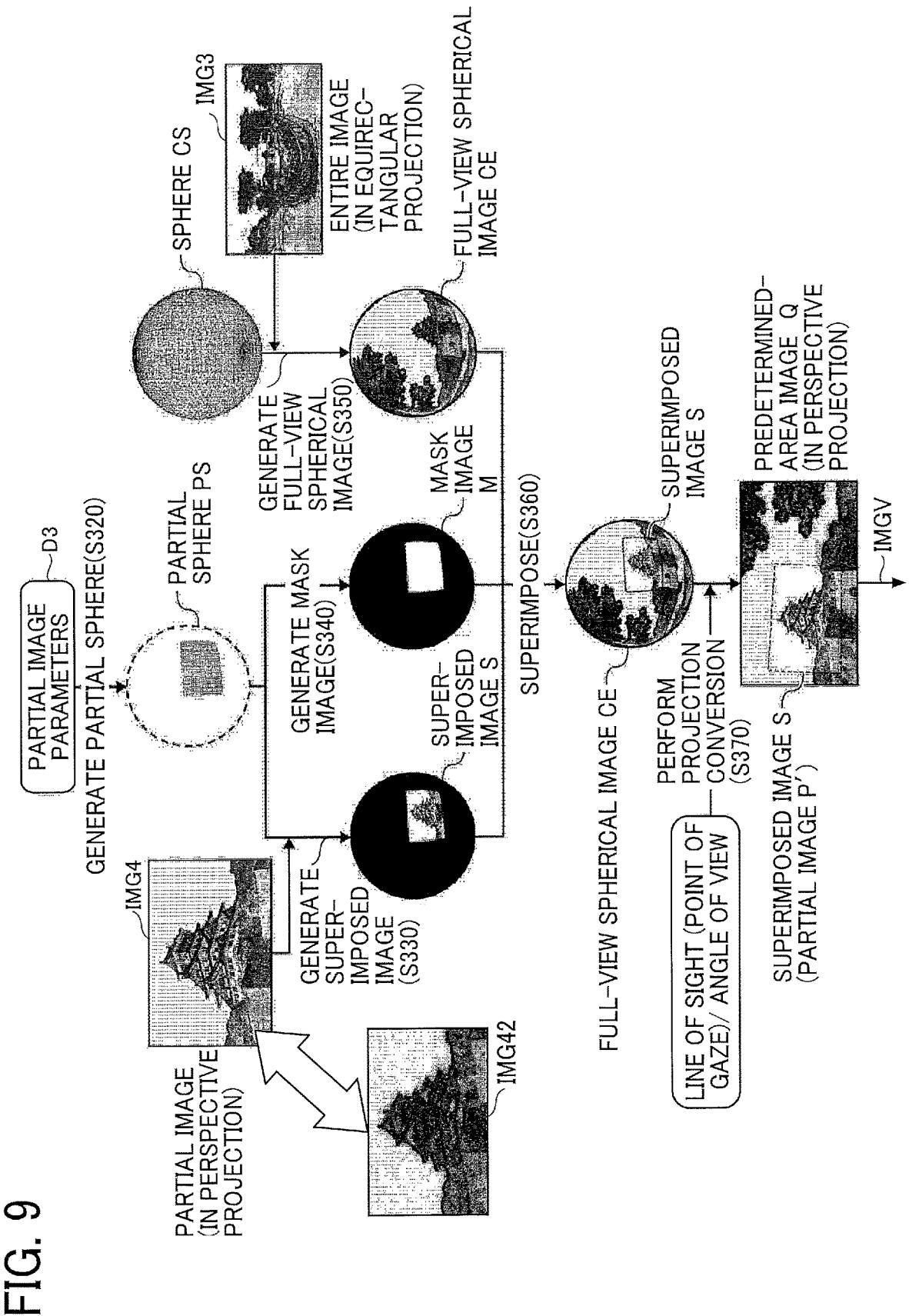
FIG. 9 is a flow diagram illustrating an example process performed by the information processing apparatus.

FIG. 9 is a flow diagram illustrating an example process performed by the information processing apparatus.

In step S320, the information processing apparatus generates a partial sphere PS in accordance with the partial image parameters D3. For example, the area corresponding to the image captured by the spherical image capturing apparatus 1 is represented by the sphere CS. The partial sphere PS is the surface area of a portion of the sphere CS, which represents the area represented by the partial image. The generation of the partial sphere PS will be described in detail below.

In step S330, the information processing apparatus superimposes the partial image in perspective projection on the partial sphere PS. As described above, the image to be used as the partial image differs depending on whether the partial image transmitted using the transmission data DS1 is the partial image (high-definition image) IMG41 or the partial image (low-definition image) IMG42. Accordingly, as illustrated in FIG. 9, the superimposed image S is generated.

In step S340, the information processing apparatus generates the mask image M.

In step S350, the information processing apparatus maps the entire image in equirectangular projection on the sphere CS. Accordingly, the information processing apparatus generates the full-view spherical image CE.

In step S360, the information processing apparatus superimposes the superimposed image S, the mask image M, and the full-view spherical image CE. Through the processing, the information processing apparatus can generate an image in which an area represented by the partial image in the full-view spherical image CE is replaced by the partial image. Thus, when the partial image is the partial image (high-definition image) IMG41, a portion of the full-view spherical image CE, which corresponds to the partial image, is a high-definition image.

In step S370, the information processing apparatus performs projection conversion using the line of sight and angle of view of the virtual camera, which are determined in advance, such that a predetermined area in the full-view spherical image CE having superimposed thereon the superimposed image S is made visible on the display.

Then, the information processing apparatus displays a predetermined-area image Q as the display image IMGV.

Example of Generation of Partial Sphere

Figure 10:
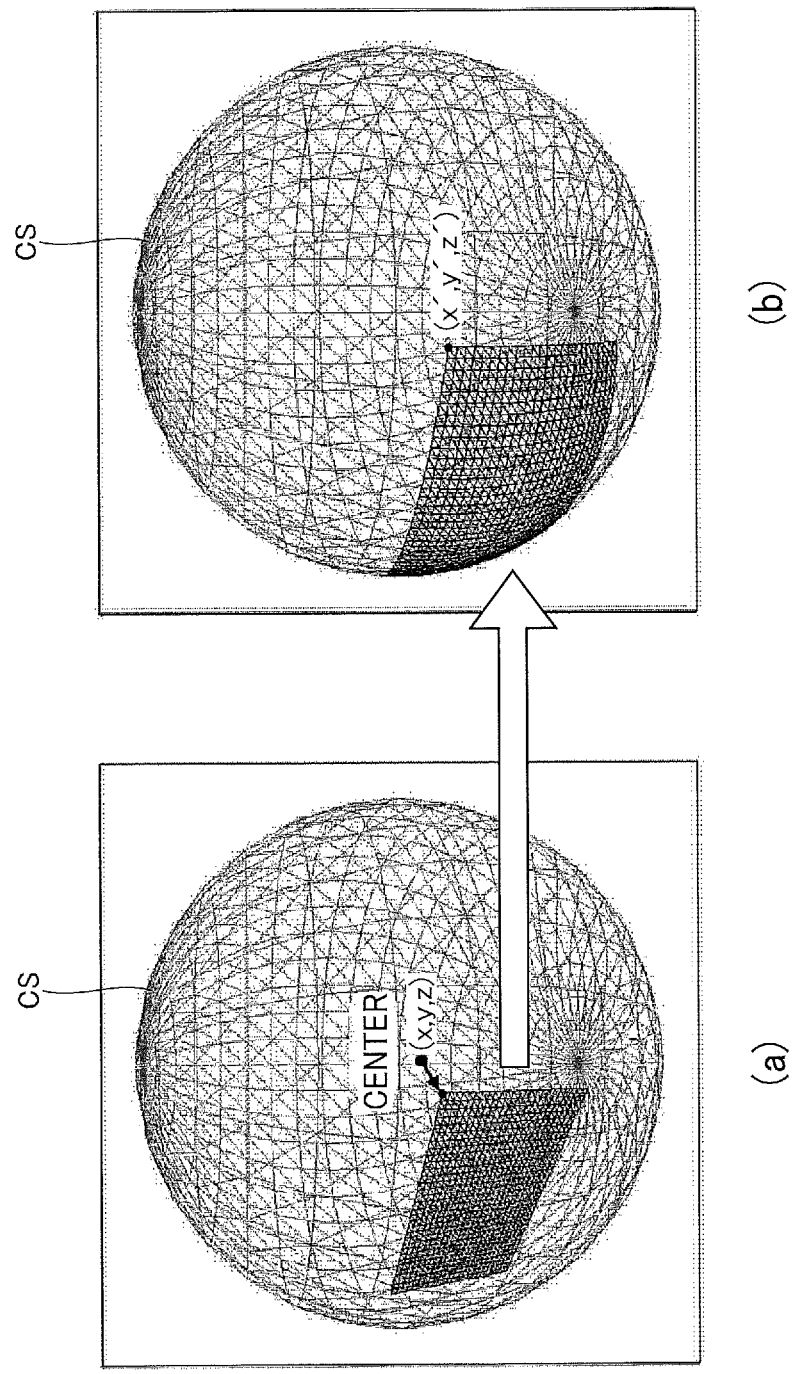
FIG. 10 is an illustration of an example of generation of a partial sphere.

FIGS. 10A and 10B illustrate an example of generation of a partial sphere. As illustrated in FIG. 10, for example, a partial sphere is generated from a partial planar surface. Since perspective projection involves projection onto a planar surface, for example, as illustrated in FIG. 10(a), an area corresponding to the partial image on a planar surface in the three-dimensional space is identified by partial image parameters. In step S320, the information processing apparatus converts the identified planar surface into a partial sphere that is a portion of a sphere in accordance with the full-view spherical image. The conversion from a planar surface into a partial sphere will now be described.

As illustrated in FIG. 10(a), each point (X, Y, Z) arranged on the planar surface in accordance with a size (determined by the angle of view, for example) is projected onto the sphere surface. The projection onto the sphere surface is based on a straight line passing through the point (X, Y, Z) from the origin of the sphere and an intersection of the straight line on the sphere surface. Each point on the sphere surface is a point whose distance from the origin is equal to the radius of the sphere. Thus, assuming that the sphere has a radius of "1", as illustrated in FIG. 10(b), a point (X', Y', Z') on the sphere surface is calculated using Eq. (6).

$$(X',Y',Z')=(X,Y,Z)\times 1/\sqrt{(X^2+Y^2+Z^2)} \quad (6)$$

Accordingly, using Eq. (6), the information processing apparatus can calculate the coordinates of an area defined by the partial image parameters on the sphere surface.

Example Using No Partial Sphere

Figure 11:
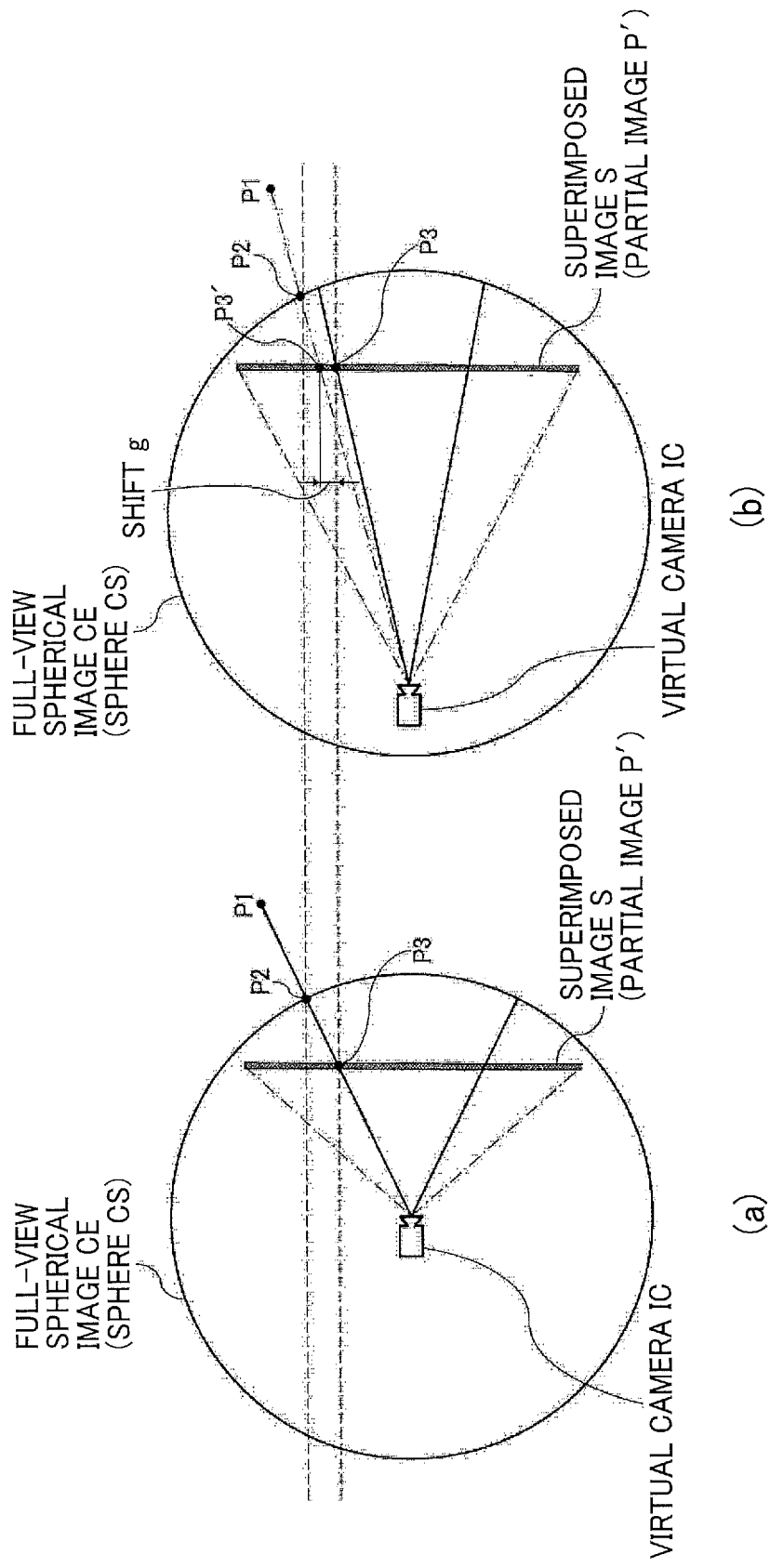
FIG. 11 is an illustration of an example using no partial sphere.

FIG. 11 is an illustration of an example using no partial sphere.

As illustrated in FIG. 11(a), a virtual camera IC is located at the central point of the sphere CS, and the central point is used as a reference. In the example, furthermore, an object is positioned at a location "P1" (hereinafter referred to as an "object P1"). In this case, the object P1 corresponds to an object P2 on the full-view spherical image CE. The object P1 corresponds to an object P3 on the superimposed image S.

As illustrated in FIG. 11(a), the object P2 and the object P3 are positioned along a straight line connecting the virtual camera IC and the object P1. Thus, no shift is generated between the full-view spherical image CE and the superimposed image S even when the superimposed image S is displayed in such a manner as to be superimposed on the full-view spherical image CE.

However, as illustrated in FIG. 11(b), in some cases, the virtual camera IC is moved away from the central point of the sphere CS in order to, for example, reduce the angle of view. In this case, as in FIG. 11(a), the object P2 is positioned along a straight line connecting the virtual camera IC and the object P1. On the other hand, the object P3 is positioned slightly nearer the center of the superimposed image S. Assuming that an object on the superimposed image S, which is positioned along a straight line connecting the virtual camera IC and the object P1, is represented by an object P3', in FIG. 11(b), a shift "g" corresponding to the difference between the object P3 and the object P3' is generated between the full-view spherical image CE and the superimposed image S. Accordingly, the superimposed image S is displayed with a shift against the full-view spherical image CE. The information processing apparatus may perform such superimposition display.

Example Using Partial Sphere

Figure 12:
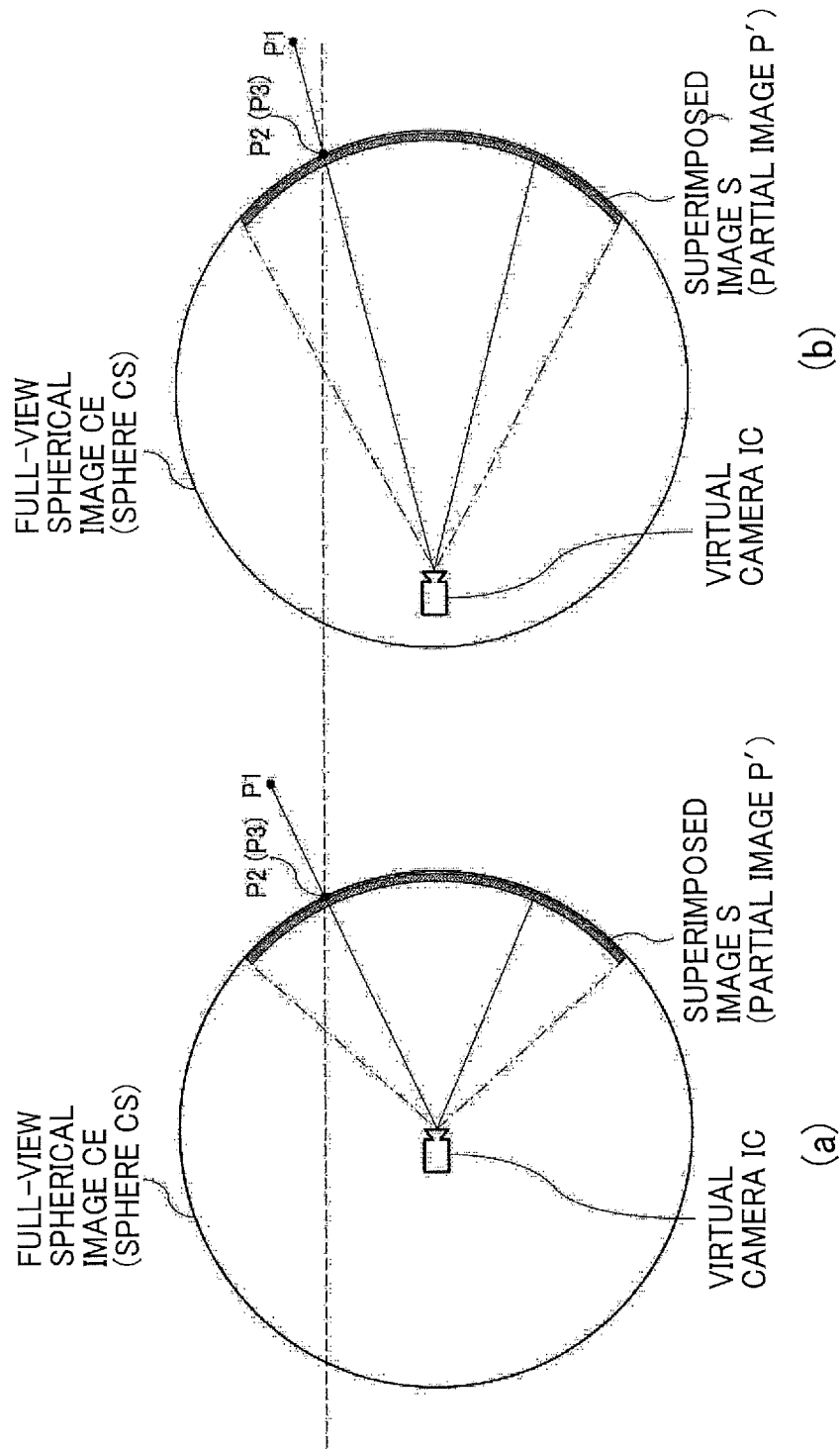
FIG. 12 is an illustration of an example using a partial sphere.

FIGS. 12A and 12B illustrate an example using a partial sphere. In the following description, the conditions other than the use of a partial sphere are similar to those in the example illustrated in FIGS. 11A and 11B. With the use of a partial sphere, the information processing apparatus can superimpose the superimposed image S along the full-view spherical image CE. Accordingly, as illustrated in FIG. 12(a), even when the virtual camera IC is located at the central point of the sphere CS, the information processing apparatus can superimpose the superimposed image S along the full-view spherical image CE with a reduced shift.

Also, as illustrated in FIG. 12(b), even if the virtual camera IC is moved away from the central point of the sphere CS, the information processing apparatus can superimpose the superimposed image S along the full-view spherical image CE with a smaller shift than that in FIG. 11(b).

Comparative Example for Determining Whether to Use Partial Image

First, when no partial image is used, the information processing apparatus performs display as follows, for example.

FIG. 13 is an illustration of a comparative example.

For example, as illustrated in FIG. 13(a), a comparative example is described in which a partial image is not superimposed on the full-view spherical image CE. When an image illustrated in FIG. 13(a) is being displayed, for example, a user performs an operation of displaying an area indicated by a broken line in an enlarged manner. In response to this operation, the information processing apparatus displays an image illustrated in FIG. 13B, for example.

The image illustrated in FIG. 13(b) is a low-definition image. In the comparative example, therefore, a low-definition image is presented to the user.

FIG. 14 is an illustration of an example using a partial image. In FIGS. 14A and 14B, unlike FIGS. 13A and 13B, the partial image P' is superimposed on the full-view spherical image CE. A user performs an operation of displaying an area indicated by a broken line in an enlarged manner in a way similar to that in FIGS. 13A and 13B. In response to this operation, the information processing apparatus displays a high-definition image illustrated in FIG. 14(b), for example.

The image illustrated in FIG. 14(b) is an image including many high-definition portions. With the use of a partial image, accordingly, the information processing apparatus can present a high-definition image to the user. For example, when the area indicated by the broken line includes a signboard with letters, the letters may be blurred and unreadable even when enlarged if a high-definition partial image is not superimposed and displayed. In contrast, as illustrated in FIG. 14(b), superimposition of a high-definition partial image makes the letters and the like clearly visible. This enables the user to understand what is written. As described above, according to this embodiment, first, the spherical image capturing apparatus 1 generates a low-definition entire image from a high-definition full-view spherical image in step S140.

Then, in step S150, when a viewable area includes an area represented by a partial image, the spherical image capturing apparatus 1 generates, from the same high-definition full-view spherical image, a high-definition partial image in a different projection from that of the high-definition full-view spherical image.

Then, the spherical image capturing apparatus 1 transmits data of the low-definition entire image and data of the high-definition partial image to the information processing apparatus.

Then, in step S360, the information processing apparatus superimposes the high-definition partial image on the low-definition entire image.

Then, in step S370, the information processing apparatus converts the projection method in accordance with the line of sight and the angle of view that are specified by the user.

In the image processing system, accordingly, the spherical image capturing apparatus 1 transmits an area of interest in a high-definition full-view spherical image obtained by capturing an image of an object, as a high-definition partial image, to the information processing apparatus. On the other hand, the spherical image capturing apparatus 1 transmits an area of no interest, or an image to be used to determine an overview of a full-view spherical image, as a low-definition entire image, to the information processing apparatus. The partial image is converted in projection method before transmission. This can reduce the amount of data to be received by the information processing apparatus on the recipient side. Accordingly, an advantage such as readily displaying a full-view spherical image in which the partial image is superimposed on the entire image is achieved. The spherical image capturing apparatus 1 may transmit an entire image and a partial image whose sizes are reduced. Even when the entire image and the partial image have different projection methods, the information processing apparatus can combine and display the entire image and the partial image. Thus, advantageously, high versatility to projection methods is provided.

In the image processing system configured to perform the process described above, a partial image representing an area not included in an area to be displayed on the information processing apparatus is sometimes generated. Such a partial image is not displayed and may thus cause no problem even if the partial image is a low-definition image. In this case, accordingly, the partial image is transmitted as a low-definition image. This configuration can reduce the data size of the partial image because of the partial image being a low-definition image. Therefore, transmission data can be transmitted at a lower bit rate than when a high-definition partial image is transmitted.

Specifically, the image processing system performs a first image generation procedure for generating the partial image (high-definition image) IMG41, which is an example of a first image, using a first image generation unit. The first image generation unit is implemented by, for example, the projection method conversion unit 18 or the like.

Then, the high-to-low definition conversion unit 20, which is an example of a determination unit, performs a determination procedure for determining, based on the viewable area D2, which is an example of a first area, whether the viewable area D2 includes an area represented by a partial image, which is an example of a second area.

If it is determined that the viewable area D2 does not include the area represented by the partial image, the high-to-low definition conversion unit 20, which is an example of a second image generation unit, performs a second image generation procedure for generating the partial image (low-definition image) IMG42, which is an example of a second image. The high-to-low definition change unit 17, which is an example of a third image generation unit, performs a third image generation procedure for generating the entire image IMG3, which is an example of a third image.

If the viewable area D2 does not include the area represented by the partial image, the transmission/receiving unit 11, which is an example of a transmission unit, performs a transmission procedure for transmitting the entire image IMG3 and the partial image (low-definition image) IMG42.

Then, the transmission/receiving unit 51, which is an example of a receiving unit, performs a reception procedure for receiving the transmitted entire image IMG3 and partial image (low-definition image) IMG42.

The display control unit 58, which is an example of an output unit, performs an output procedure for displaying the display image IMGV based on the transmitted entire image IMG3 and partial image (low-definition image) IMG42.

With the configuration described above, in the image processing system for displaying a partial image in such a manner as to be superimposed on an entire image, the amount of data of the partial image, which is transmitted and received between the spherical image capturing apparatus 1 and the information processing apparatus, can be reduced. The image processing system can therefore efficiently use the communication band to distribute an image.

In this example, a partial image may be transmitted continuously, while the user is viewing the image. However, transmission of a partial image may be stopped. For example, if a partial image has been previously transmitted and the content of the partial image does not change, or if an area represented by a partial image is not to be displayed, the transmission of the partial image may be stopped. The transmission of the partial image may be stopped for a certain period that is set. That is, a previously transmitted partial image whose content does not change can be reused to display the same image. Alternatively, if an area represented by a partial image is not to be displayed, any other area is to be displayed, and thus a portion of an image to be displayed may not be missing even without the partial image. Accordingly, stopping the transmission of a partial image can reduce the amount of data to be transmitted.

Furthermore, when the first area includes the second area and when the viewable area is smaller than a predetermined area, the spherical image capturing apparatus 1 desirably generates the second image.

Specifically, for example, if the zoom ratio is low, the second image is desirably generated. When the zoom ratio is low, an object and the like typically appear to be small. In this case, a high-definition image may be less effective. The user may thus have no problem in viewing the image even if the partial image is a low-definition image. In this case, therefore, the spherical image capturing apparatus 1 desirably transmits the entire image IMG3 and the partial image (low-definition image) IMG42. This enables the image processing system to further reduce the amount of data to be transmitted.

The zoom ratio may be specified by the user. Further, the threshold for the zoom ratio to determine whether to use a low-definition partial image is set in advance, for example.

Second Embodiment

A second embodiment is different from the first embodiment in that a plurality of partial images are used. For example, in the second embodiment, a plurality of areas, each of which corresponds to a partial image, are input as follows.

Figure 15:
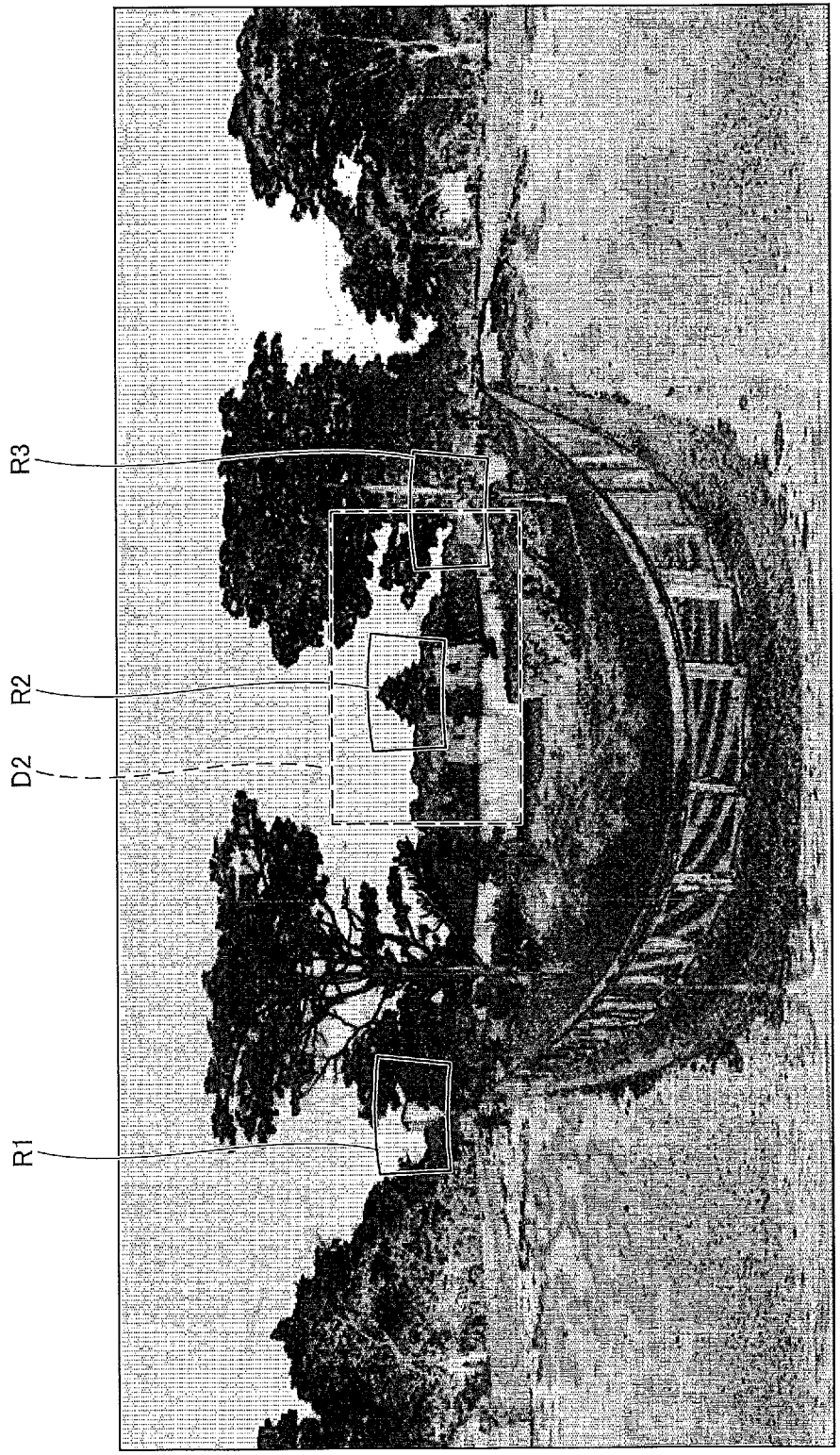
FIG. 15 is an illustration of an example of a viewable area and areas represented by a plurality of partial images according to a second embodiment.

FIG. 15 illustrates an example of a viewable area and areas represented by a plurality of partial images according to the second embodiment. For example, when a wide-angle image illustrated in FIG. 15 is generated, an area identified by the viewable area D2 is assumed to be displayed on the information processing apparatus.

Then, for example, as illustrated in FIG. 15, a first designation range R1, a second designation range R2, and a third designation range R3 are set in advance. Each of the first designation range R1, the second designation range R2, and the third designation range R3 defines an area corresponding to a partial image. That is, in the example illustrated in FIG. 15, the first designation range R1, the second designation range R2, and the third designation range R3 are designated such that three partial images representing the first designation range R1, the second designation range R2, and the third designation range R3 are generated. A plurality of partial images are used. That is, four or more partial images or two partial images may be used.

In the settings illustrated in FIG. 15, first, the spherical image capturing apparatus 1 performs determination as follows, for example.

The spherical image capturing apparatus 1 determines that the viewable area D2 does not include the first designation range R1. Accordingly, the spherical image capturing apparatus 1 generates the partial image representing the first designation range R1 as a low-definition partial image.

The spherical image capturing apparatus 1 determines that the viewable area D2 includes the second designation range R2. Accordingly, the spherical image capturing apparatus 1 generates the partial image representing the second designation range R2 as a high-definition partial image.

The spherical image capturing apparatus 1 determines that the viewable area D2 includes a portion of the third designation range R3. Accordingly, the spherical image capturing apparatus 1 generates the partial image representing the third designation range R3 as a high-definition partial image.

In this way, the spherical image capturing apparatus 1 determines, for each image, whether to use a low-definition partial image, and generates an image accordingly.

In the illustrated example, since a low-definition partial image is used for the first designation range R1, the image processing system can reduce the amount of data.

After the process described above, the spherical image capturing apparatus 1 transmits the following transmission data to the information processing apparatus, for example.

Figure 16:
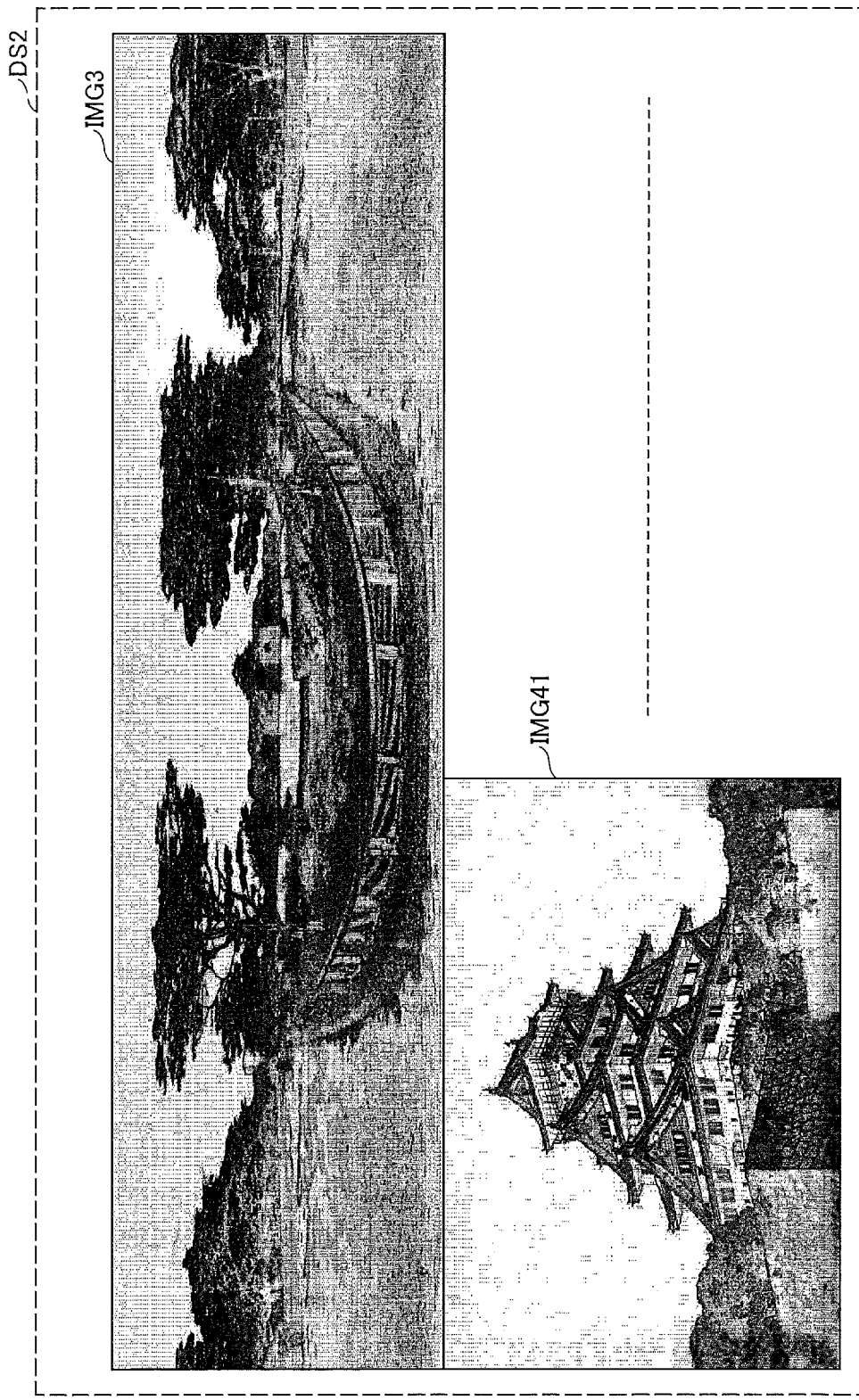
FIG. 16 is an illustration of an example of transmission data according to the second embodiment.

FIG. 16 illustrates an example of transmission data according to the second embodiment. In the second embodiment, a plurality of partial images are generated. Accordingly, as illustrated in FIG. 16, transmission data DS2 indicating a plurality of partial images in addition to the entire image IMG3 is transmitted to the information processing apparatus. As in the first embodiment, an entire image and a plurality of partial images may not necessarily be transmitted using a single piece of data such as the transmission data DS2. That is, an entire image and a plurality of partial images may be transmitted separately.

Example of Operation Screen

In the image processing system, the information processing apparatus desirably displays the following operation screen, for example.

Figure 17:
FIG. 17 is an illustration of an example of an operation screen for adding an area to be displayed with high definition and deleting an area to be displayed with high definition.

FIG. 17 illustrates an example of an operation screen for adding an area to be displayed with high definition and deleting an area to be displayed with high definition. An example will be described in which, for example, the information processing apparatus displays the display image IMGV illustrated in FIG. 17.

An area to be displayed with high definition can be added by, for example, an operation on the operation screen, such as dragging a point on the screen. An operation of displaying an area illustrated in FIG. 17 (hereinafter referred to as an "addition area R22") with high definition will be described, by way of example.

In response to an operation of specifying the addition area R22, for example, as illustrated in FIG. 17, the information processing apparatus displays a button labeled "ADD" (hereinafter referred to as an "ADD button BT1"). When the ADD button BT1 is pressed, the information processing apparatus adds the addition area R22 as an area to be displayed with high definition. Accordingly, the information processing apparatus requests the spherical image capturing apparatus 1 to transmit a partial image representing the addition area R22 as a high-definition image. This makes the addition area R22 clearly visible to the user.

On the operation screen, it is also desirable to allow the user to perform an operation of deleting an area to be displayed with high definition, such as the addition area R22. As illustrated in FIG. 17, the deletion is, for example, an operation using a button labeled "DELETE" (hereinafter referred to as a "DELETE button BT2"). Specifically, an area illustrated in FIG. 17 (hereinafter referred to as a "set area R21") is set in advance to be displayed with high definition. In response to an operation of clicking on the set area R21, as illustrated in FIG. 17, for example, the information processing apparatus displays the DELETE button BT2.

When the DELETE button BT2 is pressed, the information processing apparatus requests the spherical image capturing apparatus 1 to transmit a partial image representing the set area R21 as a low-definition image or to stop generation of the partial image. This enables the image processing system to reduce the amount of data of the partial image representing the set area R21.

The image processing system may not necessarily have the general arrangement described above. For example, in the image processing system, the image capturing apparatus and the information processing apparatus may be implemented as a plurality of apparatuses.

An embodiment of the present disclosure may be implemented by a program for causing a computer of an image processing system or the like to perform a portion or all of an image processing method.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

In any one of the above-described embodiments, the partial image, which is the planar image, is superimposed on the entire image, which is the spherical image. In this disclosure, examples of superimposition of images include, but not limited to, placement of one image on top of other image entirely or partly, laying one image over other image entirely or partly, mapping one image on other image entirely or partly, pasting one image on other image entirely or partly, combining one image with other image, and integrating one image with other image. That is, as long as the user can perceive a plurality of images (such as the spherical image and the planar image) being displayed on a display as they were one image, processing to be performed on those images for display is not limited to the above-described examples.

Further, any one of the images described above, such as the entire image and the partial image, may each be generated as any combination of a moving image and a still image. That is, both of the entire image and the partial image may be a moving image, or a still image. Either one of the entire image and the partial image may be a moving image, or a still image.

Each of the functions of the described embodiments may be implemented by one or more processing circuits or circuitry. Processing circuitry includes a programmed processor, as a processor includes circuitry. Processing circuitry includes a programmed processor, as a processor includes circuitry. A processing circuit also includes devices such as an application specific integrated circuit (ASIC), digital signal processor (DSP), field programmable gate array (FPGA), programmable logical circuit (PLD), discrete gate, transistor logical device, and conventional circuit components arranged to perform the recited functions. Further, any one of the above-described memories, or any device capable of storing data, may be implemented by, for example, a USB memory, flash memory, removable disc, ROM, RAM, magnetic disc, and optical disc.

The invention claimed is:

1. An image capturing apparatus communicably connected to an information processing apparatus, the image capturing apparatus comprising:
    an imaging device configured to capture a wide-angle image; and
    circuitry configured to:
        generate a first image representing a part of the wide-angle image; and
        determine whether a first area includes a second area being represented by the first image, the first area being a viewable area to be displayed on a display of the information processing apparatus,
    wherein, based on a determination that the first area does not include the second area, the circuitry is further configured to
        convert the first image into a second image, the second image having definition lower than that of the first image,
        convert the wide-angle image into a third image, the third image having definition lower than that of the wide-angle image, and
        transmit the second image and the third image to the information processing apparatus, such that the second image and the third image are displayable on the display of the information processing apparatus.

2. The image capturing apparatus of claim 1, wherein, based on a determination that the first area includes the second area, the circuitry transmits the first image having definition higher than that of the second image to the information processing apparatus, such that the first image is displayed on the display of the information processing apparatus.

3. The image capturing apparatus of claim 2, wherein the circuitry keeps transmitting the second image, and
    based on a determination that the second image to be transmitted has not changed from the second image that is previously transmitted, the circuitry stops transmission of the second image.

4. The image capturing apparatus of claim 2, wherein, based on the determination that the first area includes the second area, the circuitry is configured to generate the second image having definition lower than that of the first image, when a zoom ratio at the information processing apparatus is low.

5. The image capturing apparatus of claim 1, wherein the first image includes a plurality of first images, and the second area includes a plurality of second areas corresponding to the plurality of first images.

6. An image processing system comprising:
    the image capturing apparatus of claim 1; and
    an information processing apparatus comprising another circuitry configured to:
        receive the second image and the third image from the image capturing apparatus; and
        display at least the third image on the display.

7. The image processing system of claim 6,
    wherein, based on a determination that the first area includes the second area, the circuitry of the image capturing apparatus transmits the first image having definition higher than that of the second image to the information processing apparatus, and
    the another circuitry of the information processing apparatus displays the first image on the display.

8. The image processing system of claim 7, wherein the first image includes a plurality of first images, and the second area includes a plurality of second areas corresponding to the plurality of first images, and
    the another circuitry of the information processing apparatus is configured to accept an operation of selecting at least one of the plurality of second areas to be displayed,
    the first image being displayed on the selected second area.

9. An image processing method comprising:
    obtaining a wide-angle image, using an image capturing apparatus;
    generating a first image representing a part of the wide-angle image; and
    determining whether a first area includes a second area being represented by the first image, the first area being a viewable area to be displayed on a display of an information processing apparatus,
    wherein, based on a determination that the first area does not include the second area, the method further comprising:
        converting the first image into a second image, the second image having definition lower than that of the first image;
        converting the wide-angle image into a third image, the third image having definition lower than that of the wide-angle image; and
        transmitting the second image and the third image to the information processing apparatus, such that the second image and the third image are displayable on the display of the information processing apparatus.

10. A non-transitory recording medium storing a plurality of instructions which, when executed by one or more processors, cause the processors to perform an image processing method comprising:
    obtaining a wide-angle image, using an image capturing apparatus;
    generating a first image representing a part of the wide-angle image; and
    determining whether a first area includes a second area being represented by the first image, the first area being a viewable area to be displayed on a display of an information processing apparatus,
    wherein, based on a determination that the first area does not include the second area, the method further comprising:

converting the first image into a second image, the second image having definition lower than that of the first image;
converting the wide-angle image into a third image, the third image having definition lower than that of the wide-angle image; and
transmitting the second image and the third image to the information processing apparatus, such that the second image and the third image are displayable on the display of the information processing apparatus.

* * * * *